US011922669B1

United States Patent
Sastry et al.

(10) Patent No.: US 11,922,669 B1
(45) Date of Patent: Mar. 5, 2024

(54) OBJECT DETECTION VIA REGIONS OF INTEREST

(71) Applicant: SimpliSafe, Inc., Boston, MA (US)

(72) Inventors: Shekhar Bangalore Sastry, Arlington, MA (US); Nicholas Setzer, Boston, MA (US); Monica Xu, Cambridge, MA (US); Alexander Pollack, Pinellas, FL (US); Shreyas Kamath, Medford, MA (US)

(73) Assignee: SimpliSafe, Inc., Boston, MA (US)

( * ) Notice: Subject to any disclaimer, the term of this patent is extended or adjusted under 35 U.S.C. 154(b) by 0 days.

(21) Appl. No.: 18/362,758

(22) Filed: Jul. 31, 2023

(51) Int. Cl.
  *G06V 10/25* (2022.01)
  *G06T 7/215* (2017.01)
  *G08B 21/18* (2006.01)

(52) U.S. Cl.
  CPC .............. *G06V 10/25* (2022.01); *G06T 7/215* (2017.01); *G08B 21/18* (2013.01)

(58) Field of Classification Search
  CPC .................................. G06V 10/25; G06T 7/215
  See application file for complete search history.

(56) References Cited

U.S. PATENT DOCUMENTS

| | | | |
|---|---|---|---|
| 6,580,812 B1 * | 6/2003 | Harrington | G06T 7/246 356/27 |
| 9,906,722 B1 | 2/2018 | Gigot | |
| 11,257,226 B1 | 2/2022 | Solh et al. | |
| 11,336,869 B2 | 5/2022 | Yao et al. | |
| 2012/0314901 A1 | 12/2012 | Hanson et al. | |
| 2013/0293460 A1 | 11/2013 | Kaplan et al. | |
| 2017/0109613 A1 | 4/2017 | Kolavennu et al. | |
| 2019/0311201 A1 | 10/2019 | Selinger et al. | |
| 2021/0329193 A1 | 10/2021 | Wu et al. | |
| 2023/0014948 A1 | 1/2023 | Guan | |
| 2023/0156323 A1 | 5/2023 | Hanzawa | |

\* cited by examiner

*Primary Examiner* — Sam Bhattacharya
(74) *Attorney, Agent, or Firm* — Finch & Maloney PLLC

(57) ABSTRACT

A method is provided. The method includes identifying pixels indicative of motion based on a frame of pixels; selecting a region of interest within the frame based on the pixels indicative of motion, the region being a subset of the frame of pixels and including the pixels indicative of the motion; identifying an object based on pixels within the region; and issuing an alarm in response to the region including both the object and the pixels indicative of motion.

20 Claims, 18 Drawing Sheets

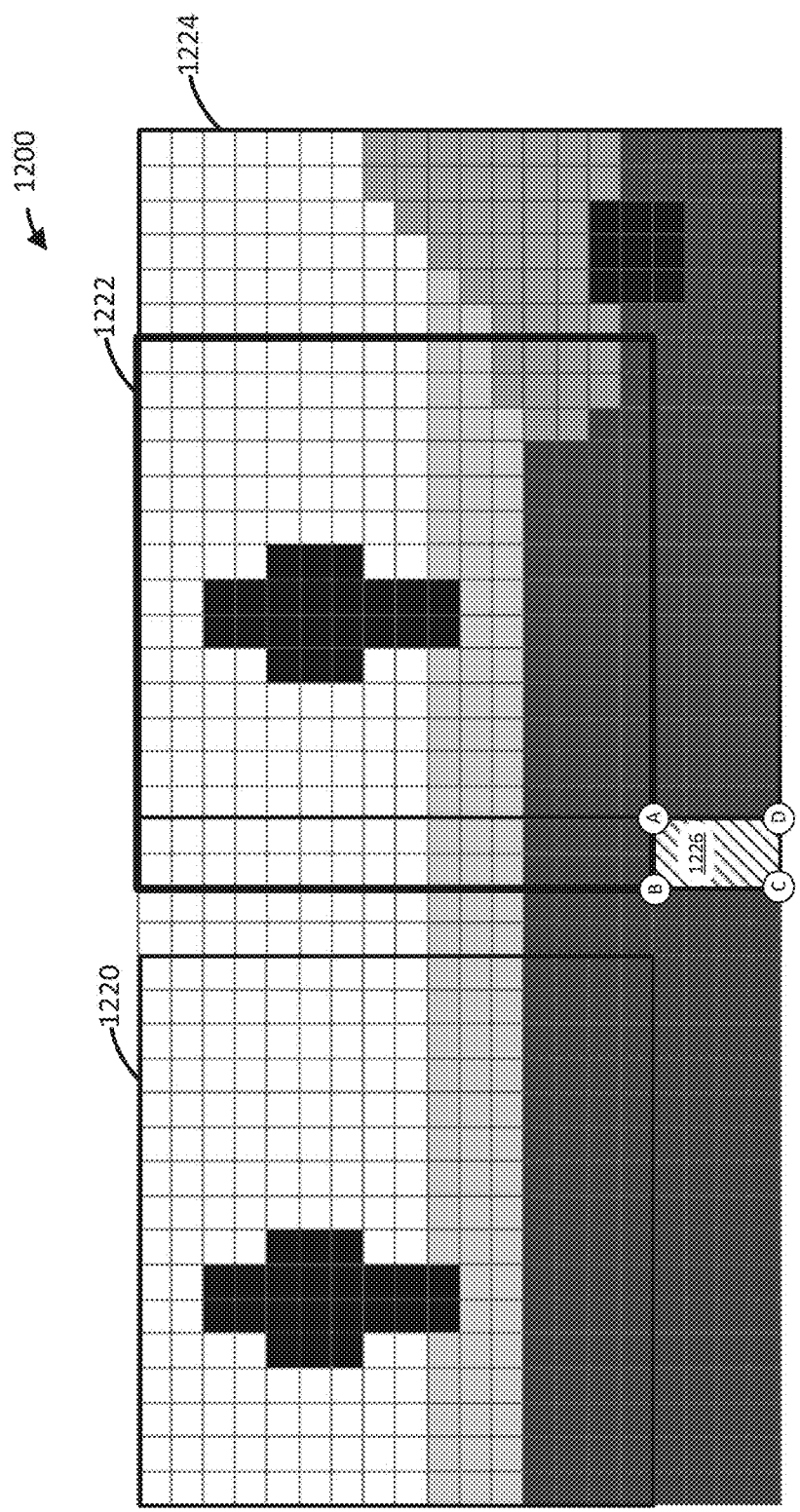

OBJECT DETECTION VIA REGIONS OF INTEREST

TECHNICAL FIELD

Aspects of the technologies described herein relate to security systems and methods.

BACKGROUND

Some monitoring systems use one or more cameras to capture images of areas around or within a residence or business location. Such monitoring systems can process images locally and transmit the captured images to a remote service. If motion is detected, the monitoring systems can send an alert to one or more user devices.

SUMMARY

This disclosure is directed to techniques for detecting objects depicted within images using regions of interest. In at least one example a method is provided. The method includes identifying pixels indicative of motion based on a frame of pixels; selecting a region of interest within the frame based on the pixels indicative of motion, the region being a subset of the frame of pixels and including the pixels indicative of the motion; identifying an object based on pixels within the region; and issuing an alarm in response to the region including both the object and the pixels indicative of motion.

In another example, a computing device is provided. The computing device includes a memory and at least one processor coupled with the memory and configured to identify pixels indicative of motion based on a frame of pixels, select a region of interest within the frame based on the pixels indicative of motion, the region being a subset of the frame of pixels and including the pixels indicative of the motion, identify an object based on pixels within the region, and issue an alarm in response to the region including both the object and the pixels indicative of motion.

In another example, one or more computer readable media are provided. The one or more computer readable media store sequences of instructions executable to use regions of interest to detect objects in a frame of image data. The sequences of instructions include instructions to identify pixels indicative of motion based on a frame of pixels; select a region of interest within the frame based on the pixels indicative of motion, the region being a subset of the frame of pixels and including the pixels indicative of the motion; identify an object based on pixels within the region; and issue an alarm in response to the region including both the object and the pixels indicative of motion.

BRIEF DESCRIPTION OF THE DRAWINGS

Additional examples of the disclosure, as well as features and advantages thereof, will become more apparent by reference to the description herein taken in conjunction with the accompanying drawings which are incorporated in and constitute a part of this disclosure. The figures are not necessarily drawn to scale.

FIG. 12C is a diagram illustrating translation of ROIs associated with the frame of image data of FIG. 12A, according to some examples described herein.

DETAILED DESCRIPTION

Figure 1:
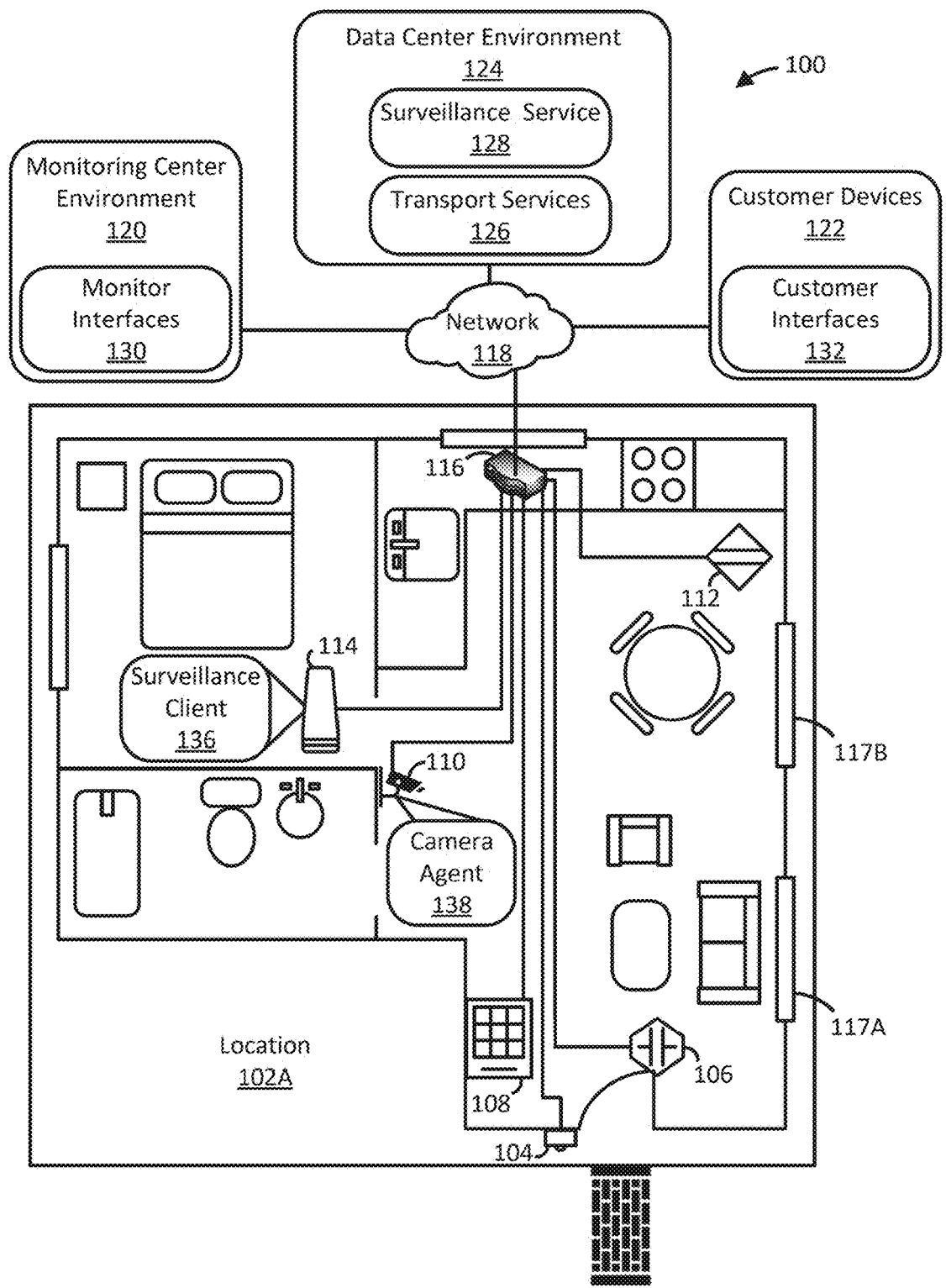
FIG. 1 is a schematic diagram of a security system, according to some examples described herein.

As summarized above, at least some examples disclosed herein are directed to systems and processes that detect objects represented within image data. In some implementations, these systems and processes are utilized in security systems to efficiently monitor spaces that are physically proximal to the devices that surveil the spaces. In these implementations, the systems and processes take advantage of attributes of the operating environment to realize technological advantages over other security systems, as will be described further below. These advantages include, among others, reduced power consumption, reduced false positive detection of security threats, and/or improved detection of small objects.

Security systems can include a range of sensors configured to detect various events, such as motion, moisture, temperature changes, and sounds, among others. For example, passive infrared (PIR) sensors are motion sensors that detect changes in temperature in a field of view. The PIR sensors can be configured with a threshold such that any change larger than the threshold constitutes motion and causes a motion trigger. Imaging sensors can be capable of distinguishing between certain objects, such as people, for example, in captured image frames. The image sensors can be configured to trigger an object detection alert if an object of interest is identified within an image frame. Imaging sensors can use any of a variety of techniques to locate and recognize objects in a frame. For example, computer vision based object detection can use specialized filters to locate different attributes or features within an image frame and then combine the features to classify whether or not a particular category of object is found. For example, an object detector can locate all human faces in a frame. Recently, machine learning (ML) or artificial intelligence (AI) based approaches are used wherein processes or models are trained on a vast number of images containing objects of interest to recognize similar objects in new or unseen images.

When deploying AI or ML models within security systems that include battery powered devices, some poignant concerns and constraints are memory volume and model efficiency. A common practice to work in favor of these constraints is to deploy smaller models, both in model size as well as operating resolution. While a smaller operating resolution for model inference can allow for improved inference rates, it also requires image preprocessing including padding (for reshaping) or resizing images to fit the model input dimensions. Both of these preprocessing steps can lead to distortion of the original image context such as pixel data loss in downsampling or the shrinking of objects relative size within the image. These issues can pose problems for how effectively a model can detect objects within image frames, especially in the case of relatively small objects, which when downsampling have the potential to be virtually erased.

In view of these and other concerns and constraints, at least some of the examples disclosed herein preserve image data and context by cropping regions of interest (ROIs) from an image rather than reshaping or resizing the image. Cropping is different from reshaping or resizing in that cropping removes unwanted background from an image, thereby increasing the percentage of pixels in the image used to depict objects within the crop. Resizing an image, which can involve upsampling or downsampling, alters resolution of the image while preserving proportionality of the original content. Reshaping an image alters its aspect ratio and can involve insertion of padding (added pixels). In some examples, crops can be created at or near the size of model input dimensions, which allows for minimal to no downsampling. Additionally, square crops can be taken from the image, which is typically required for model input, allowing for no further padding or image reshaping. Taking a crop from an image at its original dimensions in this manner allows for retaining unadulterated pixel data depicting objects, as well as preserving relevant structural context of the objects that reside within the frame. This is so because cropping does not alter pixels within the crop nor their proportionality relative to one another. Passing only the ROI from an image to the model for inference also removes extraneous image context from the original image that could lead to false positive detections.

To create crops for model inference, target regions within an image identified by a motion detector can be used to propose ROIs. Examples crops, which are subsets of pixels from an image, are illustrated further below with reference to FIG. 12D. When motion is detected, bounding boxes that encapsulate the region of motion are output. These motion regions can be used as targets to create the ROIs for cropping images. ROI's are associated with particular images. By using the motion region as the midpoint for a proposed ROI, the target coordinates are padded (extended) on either side, as well as above and below, by half of the desired ROI dimensions. This creates a set of ROI boundaries useful to create an image crop. In some examples, the image crop can be created at model input dimension centered around the target (e.g., an object in motion). This ROI-based object detection approach enables the use of smaller, resource-conserving models without sacrificing object detection accuracy. This is so because the ROIs include fewer pixels than the original image. The approach recognizes and leverages the insight that objects represented in an image can be accurately identified by analyzing only a portion of an image frame, rather than an entire image frame. This close physical proximity is often, if not always, present within the security system context, as security system devices are often placed indoors and/or near a secure location or object.

Whereas various examples are described herein, it will be apparent to those of ordinary skill in the art that many more examples and implementations are possible. Accordingly, the examples described herein are not the only possible examples and implementations. Furthermore, the advantages described above are not necessarily the only advantages, and it is not necessarily expected that all of the described advantages will be achieved with every example.

For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

FIG. 1 is a schematic diagram of a security system 100 configured to monitor geographically disparate locations in accordance with some examples. As shown in FIG. 1, the system 100 includes a monitored location 102A, a monitoring center environment 120, a data center environment 124, one or more customer devices 122, and a communication network 118. Each of the monitored location 102A, the monitoring center 120, the data center 124, the one or more customer devices 122, and the communication network 118 include one or more computing devices (e.g., as described below with reference to FIG. 13). The one or more customer devices 122 are configured to host one or more customer interface applications 132. The monitoring center environment 120 is configured to host one or more monitor interface applications 130. The data center environment 124 is configured to host a surveillance service 128 and one or more transport services 126. The location 102A includes image capture devices 104 and 110, a contact sensor assembly 106, a keypad 108, a motion sensor assembly 112, a base station 114, and a router 116. The base station 114 hosts a surveillance client 136. The image capture device 110 hosts a camera agent 138. The security devices disposed at the location 102A (e.g., devices 104, 106, 108, 110, 112, and 114) may be referred to herein as location-based devices.

In some examples, the router 116 is a wireless router that is configured to communicate with the location-based devices via communications that comport with a communications standard such as any of the various Institute of Electrical and Electronics Engineers (IEEE) 802.11 standards. As illustrated in FIG. 1, the router 116 is also configured to communicate with the network 118. It should be noted that the router 116 implements a local area network (LAN) within and proximate to the location 102A by way of example only. Other networking technology that involves other computing devices is suitable for use within the location 102A. For instance, in some examples, the base station 114 can receive and forward communication packets transmitted by the image capture device 110 via a point-to-point personal area network (PAN) protocol, such as BLUETOOTH. Other wired, wireless, and mesh network technology and topologies will be apparent with the benefit of this disclosure and are intended to fall within the scope of the examples disclosed herein.

Continuing with the example of FIG. 1, the network 118 can include one or more public and/or private networks that support, for example, IP. The network 118 may include, for example, one or more LANs, one or more PANs, and/or one or more wide area networks (WANs). The LANs can include wired or wireless networks that support various LAN standards, such as a version of IEEE 802.11 and the like. The PANs can include wired or wireless networks that support various PAN standards, such as BLUETOOTH, ZIGBEE, and the like. The WANs can include wired or wireless networks that support various WAN standards, such as the Code Division Multiple Access (CDMA) radio standard, the Global System for Mobiles (GSM) radio standard, and the like. The network 118 connects and enables data communication between the computing devices within the location 102A, the monitoring center environment 120, the data center environment 124, and the customer devices 122. In at least some examples, both the monitoring center environment 120 and the data center environment 124 include network equipment (e.g., similar to the router 116) that is configured to communicate with the network 118 and computing devices collocated with or near the network equipment. It should be noted that, in some examples, the network 118 and the network extant within the location 102A support other communication protocols, such as MQTT or other IoT protocols.

Continuing with the example of FIG. 1, the data center environment 124 can include physical space, communications, cooling, and power infrastructure to support networked operation of computing devices. For instance, this infrastructure can include rack space into which the computing devices are installed, uninterruptible power supplies, cooling plenum and equipment, and networking devices. The data center environment 124 can be dedicated to the security system 100, can be a non-dedicated, commercially available cloud computing service (e.g., MICROSOFT AZURE, AMAZON WEB SERVICES, GOOGLE CLOUD, or the like), or can include a hybrid configuration made up of dedicated and non-dedicated resources. Regardless of its physical or logical configuration, as shown in FIG. 1, the data center environment 124 is configured to host the surveillance service 128 and the transport services 126.

Continuing with the example of FIG. 1, the monitoring center environment 120 can include a plurality of computing devices (e.g., desktop computers) and network equipment (e.g., one or more routers) connected to the computing devices and the network 118. The customer devices 122 can include personal computing devices (e.g., a desktop computer, laptop, tablet, smartphone, or the like) and network equipment (e.g., a router, cellular modem, cellular radio, or the like). As illustrated in FIG. 1, the monitoring center environment 120 is configured to host the monitor interfaces 130 and the customer devices 122 are configured to host the customer interfaces 132.

Continuing with the example of FIG. 1, the devices 104, 106, 110, and 112 are configured to acquire analog signals via sensors incorporated into the devices, generate digital sensor data based on the acquired signals, and communicate (e.g. via a wireless link with the router 116) the sensor data to the base station 114. The type of sensor data generated and communicated by these devices varies along with the type of sensors included in the devices. For instance, the image capture devices 104 and 110 can acquire ambient light, generate frames of image data based on the acquired light, and communicate the frames to the base station 114, the monitor interfaces 130, and/or the customer interfaces 132, although the pixel resolution and frame rate may vary depending on the capabilities of the devices. As shown in FIG. 1, the image capture device 104 has a field of view (FOV) that originates proximal to a front door of the location 102A and can acquire images of a walkway, highway, and a space between the location 102A and the highway. The image capture device 110 has an FOV that originates proximal to a bathroom of the location 102A and can acquire images of a living room and dining area of the location 102A. The image capture device 110 can further acquire images of outdoor areas beyond the location 102A through windows 117A and 117B on the right side of the location 102A.

Further, as shown in FIG. 1, in some examples the image capture device 110 is configured to communicate with the surveillance service 128, the monitor interfaces 130, and the customer interfaces 132 separately from the surveillance client 136 via execution of the camera agent 138. These communications can include sensor data generated by the image capture device 110 and/or commands to be executed by the image capture device 110 sent by the surveillance service 128, the monitor interfaces 130, and/or the customer interfaces 132. The commands can include, for example, requests for interactive communication sessions in which monitoring personnel and/or customers interact with the image capture device 110 via the monitor interfaces 130 and the customer interfaces 132. These interactions can include requests for the image capture device 110 to transmit additional sensor data and/or requests for the image capture device 110 to render output via a user interface (e.g., the user interface 412 of FIGS. 4B & 4C). This output can include audio and/or video output.

Continuing with the example of FIG. 1, the contact sensor assembly 106 includes a sensor that can detect the presence or absence of a magnetic field generated by a magnet when the magnet is proximal to the sensor. When the magnetic field is present, the contact sensor assembly 106 generates Boolean sensor data specifying a closed state. When the magnetic field is absent, the contact sensor assembly 106 generates Boolean sensor data specifying an open state. In either case, the contact sensor assembly 106 can communicate sensor data indicating whether the front door of the location 102A is open or closed to the base station 114. The motion sensor assembly 112 can include an audio emission device that can radiate sound (e.g., ultrasonic) waves and an audio sensor that can acquire reflections of the waves. When the audio sensor detects the reflection because no objects are in motion within the space monitored by the audio sensor, the motion sensor assembly 112 generates Boolean sensor data specifying a still state. When the audio sensor does not detect a reflection because an object is in motion within the monitored space, the motion sensor assembly 112 generates Boolean sensor data specifying an alert state. In either case, the motion sensor assembly 112 can communicate the sensor data to the base station 114. It should be noted that the specific sensing modalities described above are not limiting to the present disclosure. For instance, as one of many potential examples, the motion sensor assembly 112 can base its operation on acquisition of changes in temperature rather than changes in reflected sound waves.

Continuing with the example of FIG. 1, the keypad 108 is configured to interact with a user and interoperate with the other location-based devices in response to interactions with the user. For instance, in some examples, the keypad 108 is configured to receive input from a user that specifies one or more commands and to communicate the specified commands to one or more addressed processes. These addressed processes can include processes implemented by one or more of the location-based devices and/or one or more of the monitor interfaces 130 or the surveillance service 128. The commands can include, for example, codes that authenticate the user as a resident of the location 102A and/or codes that request activation or deactivation of one or more of the location-based devices. Alternatively or additionally, in some examples, the keypad 108 includes a user interface (e.g., a tactile interface, such as a set of physical buttons or a set of virtual buttons on a touchscreen) configured to interact with a user (e.g., receive input from and/or render output to the user). Further still, in some examples, the keypad 108 can receive and respond to the communicated commands and render the responses via the user interface as visual or audio output.

Continuing with the example of FIG. 1, the base station 114 is configured to interoperate with the other location-based devices to provide local command and control and store-and-forward functionality via execution of the surveillance client 136. In some examples, to implement store-and-forward functionality, the base station 114, through execution of the surveillance client 136, receives sensor data, packages the data for transport, and stores the packaged sensor data in local memory for subsequent communication. This communication of the packaged sensor data can include, for instance, transmission of the packaged sensor data as a payload of a message to one or more of the transport services 126 when a communication link to the transport services 126 via the network 118 is operational. In some examples, packaging the sensor data can include filtering the sensor data and/or generating one or more summaries (maximum values, minimum values, average values, changes in values since the previous communication of the same, etc.) of multiple sensor readings. To implement local command and control functionality, the base station 114 executes, under control of the surveillance client 136, a variety of programmatic operations in response to various events. Examples of these events can include reception of commands from the keypad 108 or the customer interface application 132, reception of commands from one of the monitor interfaces 130 or the customer interface application 132 via the network 118, or detection of the occurrence of a scheduled event. The programmatic operations executed by the base station 114 under control of the surveillance client 136 can include activation or deactivation of one or more of the devices 104, 106, 108, 110, and 112; sounding of an alarm; reporting an event to the surveillance service 128; and communicating location data to one or more of the transport services 126 to name a few operations. The location data can include data specifying sensor readings (sensor data), configuration data of any of the location-based devices, commands input and received from a user (e.g., via the keypad 108 or a customer interface 132), or data derived from one or more of these data types (e.g., filtered sensor data, summarizations of sensor data, event data specifying an event detected at the location via the sensor data, etc).

Continuing with the example of FIG. 1, the transport services 126 are configured to securely, reliably, and efficiently exchange messages between processes implemented by the location-based devices and processes implemented by other devices in the system 100. These other devices can include the customer devices 122, devices disposed in the data center environment 124, and/or devices disposed in the monitoring center environment 120. In some examples, the transport services 126 are also configured to parse messages from the location-based devices to extract payloads included therein and store the payloads and/or data derived from the payloads within one or more data stores hosted in the data center environment 124. The data housed in these data stores may be subsequently accessed by, for example, the surveillance service 128, the monitor interfaces 130, and the customer interfaces 132.

In certain examples, the transport services 126 expose and implement one or more application programming interfaces (APIs) that are configured to receive, process, and respond to calls from processes (e.g., the surveillance client 136) implemented by base stations (e.g., the base station 114) and/or processes (e.g., the camera agent 138) implemented by other devices (e.g., the image capture device 110). Individual instances of a transport service within the transport services 126 can be associated with and specific to certain manufactures and models of location-based monitoring equipment (e.g., SIMPLISAFE equipment, RING equipment, etc.). The APIs can be implemented using a variety of architectural styles and interoperability standards. For instance, in one example, the API is a web services interface implemented using a representational state transfer (REST) architectural style. In this example, API calls are encoded in Hypertext Transfer Protocol (HTTP) along with JavaScript Object Notation (JSON) and/or extensible markup language (XML). These API calls are addressed to one or more uniform resource locators (URLs) that are API endpoints monitored by the transport services 126. In some examples, portions of the HTTP communications are encrypted to increase security. Alternatively or additionally, in some examples, the API is implemented as an MQTT broker that receives messages and transmits responsive messages to MQTT clients hosted by the base stations and/or the other devices. Alternatively or additionally, in some examples, the API is implemented using simple file transfer protocol commands. Thus, the transport services 126 are not limited to a particular protocol or architectural style. It should be noted that, in at least some examples, the transport services 126 can transmit one or more API calls to location-based devices to request data from, or an interactive communication session with, the location-based devices.

Continuing with the example of FIG. 1, the surveillance service 128 is configured to control overall logical setup and operation of the system 100. As such, the surveillance service 128 can interoperate with the transport services 126, the monitor interfaces 130, the customer interfaces 132, and any of the location-based devices. In some examples, the surveillance service 128 is configured to monitor data from a variety of sources for reportable events (e.g., a break-in event) and, when a reportable event is detected, notify one or more of the monitor interfaces 130 and/or the customer interfaces 132 of the reportable event. In some examples, the surveillance service 128 is also configured to maintain state information regarding the location 102A. This state information can indicate, for instance, whether the location 102A is safe or under threat. In certain examples, the surveillance service 128 is configured to change the state information to indicate that the location 102A is safe only upon receipt of a communication indicating a clear event (e.g., rather than making such a change in response to discontinuation of reception of break-in events). This feature can prevent a "crash and smash" robbery from being successfully executed. Further example processes that the surveillance service 128 is configured to execute are described below with reference to FIGS. 5 and 6.

Continuing with the example of FIG. 1, individual monitor interfaces 130 are configured to control computing device interaction with monitoring personnel and to execute a variety of programmatic operations in response to the interactions. For instance, in some examples, the monitor interface 130 controls its host device to provide information regarding reportable events detected at monitored locations, such as the location 102A, to monitoring personnel. Such events can include, for example, movement or an alert condition generated by one or more of the location-based devices. Alternatively or additionally, in some examples, the monitor interface 130 controls its host device to interact with a user to configure features of the system 100. Further example processes that the monitor interface 130 is configured to execute are described below with reference to FIG. 6.

Continuing with the example of FIG. 1, individual customer interfaces 132 are configured to control computing device interaction with a customer and to execute a variety of programmatic operations in response to the interactions. For instance, in some examples, the customer interface 132 controls its host device to provide information regarding reportable events detected at monitored locations, such as the location 102A, to the customer. Such events can include, for example, an alert condition generated by one or more of the location-based devices. Alternatively or additionally, in some examples, the customer interface 132 is configured to process input received from the customer to activate or deactivate one or more of the location-based devices. Further still, in some examples, the customer interface 132 configures features of the system 100 in response to input from a user. Further example processes that the customer interface 132 is configured to execute are described below with reference to FIG. 6.

Figures 2, 3:
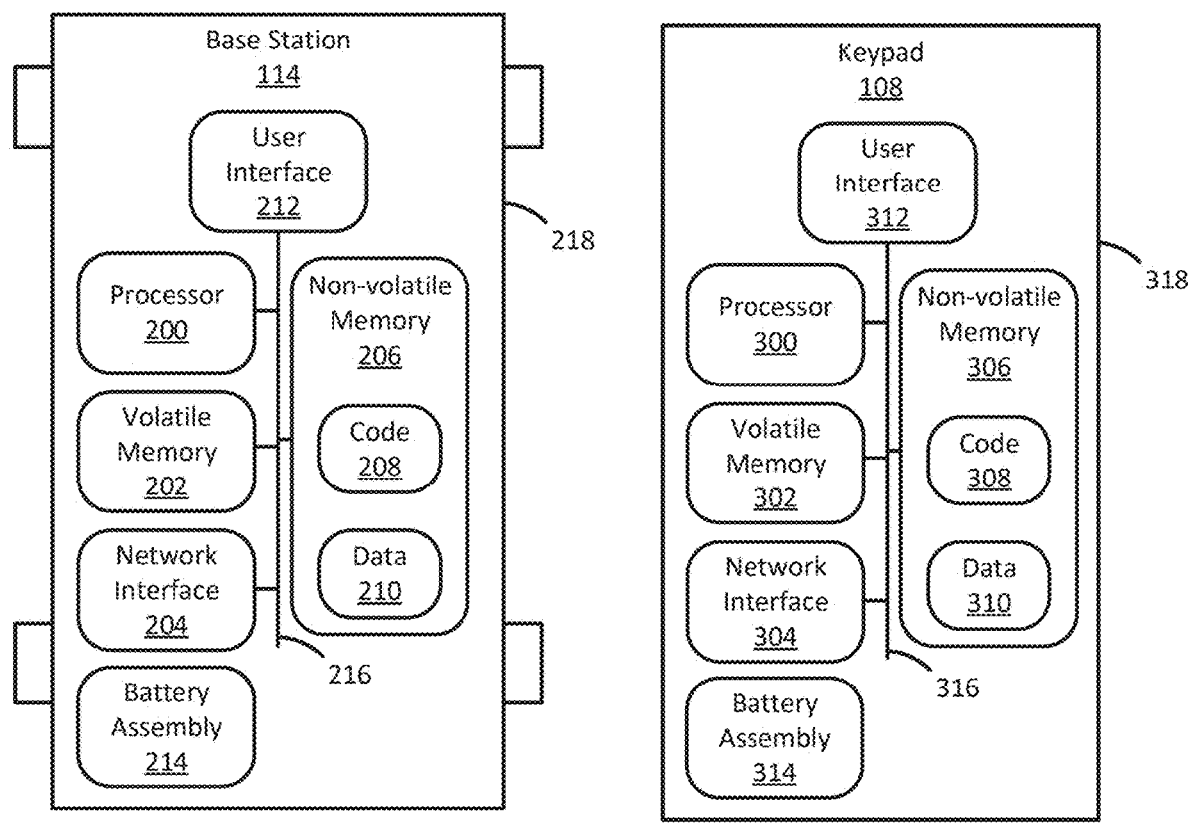
FIG. 2 is a schematic diagram of a base station, according to some examples described herein.
FIG. 3 is a schematic diagram of a keypad, according to some examples described herein.

Turning now to FIG. 2, an example base station 114 is schematically illustrated. As shown in FIG. 2, the base station 114 includes at least one processor 200, volatile memory 202, non-volatile memory 206, at least one network interface 204, a user interface 212, a battery assembly 214, and an interconnection mechanism 216. The non-volatile memory 206 stores executable code 208 and includes a data store 210. In some examples illustrated by FIG. 2, the features of the base station 114 enumerated above are incorporated within, or are a part of, a housing 218.

In some examples, the non-volatile (non-transitory) memory 206 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 208 stored in the non-volatile memory can include an operating system and one or more applications or programs that are configured to execute under the operating system. Alternatively or additionally, the code 208 can include specialized firmware and embedded software that is executable without dependence upon a commercially available operating system. Regardless, execution of the code 208 can implement the surveillance client 136 of FIG. 1 and can result in manipulated data that is a part of the data store 210.

Continuing the example of FIG. 2, the processor 200 can include one or more programmable processors to execute one or more executable instructions, such as a computer program specified by the code 208, to control the operations of the base station 114. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 202) and executed by the circuitry. In some examples, the processor 200 is a digital processor, but the processor 200 can be analog, digital, or mixed. As such, the processor 200 can execute the function, operation, or sequence of operations using digital values and/or using analog signals. In some examples, the processor 200 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 200 that are multicore can provide functionality for parallel, simultaneous execution of instructions or for parallel, simultaneous execution of one instruction on more than one piece of data.

Continuing with the example of FIG. 2, prior to execution of the code 208 the processor 200 can copy the code 208 from the non-volatile memory 206 to the volatile memory 202. In some examples, the volatile memory 202 includes one or more static or dynamic random access memory (RAM) chips and/or cache memory (e.g. memory disposed on a silicon die of the processor 200). Volatile memory 202 can offer a faster response time than a main memory, such as the non-volatile memory 206.

Through execution of the code 208, the processor 200 can control operation of the network interface 204. For instance, in some examples, the network interface 204 includes one or more physical interfaces (e.g., a radio, an ethernet port, a universal serial bus (USB) port, etc.) and a software stack including drivers and/or other code 208 that is configured to communicate with the one or more physical interfaces to support one or more LAN, PAN, and/or WAN standard communication protocols. The communication protocols can include, for example, transmission control protocol (TCP), user datagram protocol (UDP), HTTP, and MQTT among others. As such, the network interface 204 enables the base station 114 to access and communicate with other computing devices (e.g., the location-based devices) via a computer network (e.g., the LAN established by the router 116 of FIG. 1, the network 118 of FIG. 1, and/or a point-to-point connection). For instance, in at least one example, the network interface 204 utilizes sub-GHz wireless networking to transmit wake messages to the other computing devices to request streams of sensor data or other operations. Use of sub-GHz wireless networking can improve operable communication distances and/or reduce power consumed to communicate.

Through execution of the code 208, the processor 200 can control operation of the user interface 212. For instance, in some examples, the user interface 212 includes user input and/or output devices (e.g., a keyboard, a mouse, a touchscreen, a display, a speaker, a camera, an accelerometer, a biometric scanner, an environmental sensor, etc.) and a software stack including drivers and/or other code 208 that is configured to communicate with the user input and/or output devices. For instance, the user interface 212 can be implemented by a customer device 122 hosting a mobile application (e.g., a customer interface 132). The user interface 212 enables the base station 114 to interact with users to receive input and/or render output. This rendered output can include, for instance, one or more graphical user interfaces (GUIs) including one or more controls configured to display output and/or receive input. The input can specify values to be stored in the data store 210. The output can indicate values stored in the data store 210. It should be noted that, in some examples, parts of the user interface 212 are accessible and/or visible as part of, or through, the housing 218. These parts of the user interface 212 can include, for example, one or more light-emitting diodes (LEDs). Alternatively or additionally, in some examples, the user interface 212 includes a 95 db siren that the processor 200 sounds to indicate that a break-in event has been detected.

Continuing with the example of FIG. 2, the various features of the base station 114 described above can communicate with one another via the interconnection mechanism 216. In some examples, the interconnection mechanism 216 includes a communications bus. In addition, in some examples, the battery assembly 214 is configured to supply operational power to the various features of the base station 114 described above. In some examples, the battery assembly 214 includes at least one rechargeable battery (e.g., one or more NiMH or lithium batteries). In some examples, the rechargeable battery has a runtime capacity sufficient to operate the base station 114 for 24 hours or longer while the base station 114 is disconnected from or otherwise not receiving line power. Alternatively or additionally, in some examples, the battery assembly 214 includes power supply circuitry to receive, condition, and distribute line power to both operate the base station 114 and recharge the rechargeable battery. The power supply circuitry can include, for example, a transformer and a rectifier, among other circuitry, to convert AC line power to DC device and recharging power.

Turning now to FIG. 3, an example keypad 108 is schematically illustrated. As shown in FIG. 3, the keypad 108 includes at least one processor 300, volatile memory 302, non-volatile memory 306, at least one network interface 304, a user interface 312, a battery assembly 314, and an interconnection mechanism 316. The non-volatile memory 306 stores executable code 308 and a data store 310. In some examples illustrated by FIG. 3, the features of the keypad 108 enumerated above are incorporated within, or are a part of, a housing 318.

In some examples, the respective descriptions of the processor 200, the volatile memory 202, the non-volatile memory 206, the interconnection mechanism 216, and the battery assembly 214 with reference to the base station 114 are applicable to the processor 300, the volatile memory 302, the non-volatile memory 306, the interconnection mechanism 316, and the battery assembly 314 with reference to the keypad 108. As such, those descriptions will not be repeated.

Continuing with the example of FIG. 3, through execution of the code 308, the processor 300 can control operation of the network interface 304. In some examples, the network interface 304 includes one or more physical interfaces (e.g., a radio, an ethernet port, a USB port, etc.) and a software stack including drivers and/or other code 308 that is configured to communicate with the one or more physical interfaces to support one or more LAN, PAN, and/or WAN standard communication protocols. These communication protocols can include, for example, TCP, UDP, HTTP, and MQTT among others. As such, the network interface 304 enables the keypad 108 to access and communicate with other computing devices (e.g., the other location-based devices) via a computer network (e.g., the LAN established by the router 116 and/or a point-to-point connection).

Continuing with the example of FIG. 3, through execution of the code 308, the processor 300 can control operation of the user interface 312. In some examples, the user interface 312 includes user input and/or output devices (e.g., physical keys arranged as a keypad, a touchscreen, a display, a speaker, a camera, a biometric scanner, an environmental sensor, etc.) and a software stack including drivers and/or other code 308 that is configured to communicate with the user input and/or output devices. As such, the user interface 312 enables the keypad 108 to interact with users to receive input and/or render output. This rendered output can include, for instance, one or more GUIs including one or more controls configured to display output and/or receive input. The input can specify values to be stored in the data store 310. The output can indicate values stored in the data store 310. It should be noted that, in some examples, parts of the user interface 312 (e.g., one or more LEDs) are accessible and/or visible as part of, or through, the housing 318.

Figure 4A:
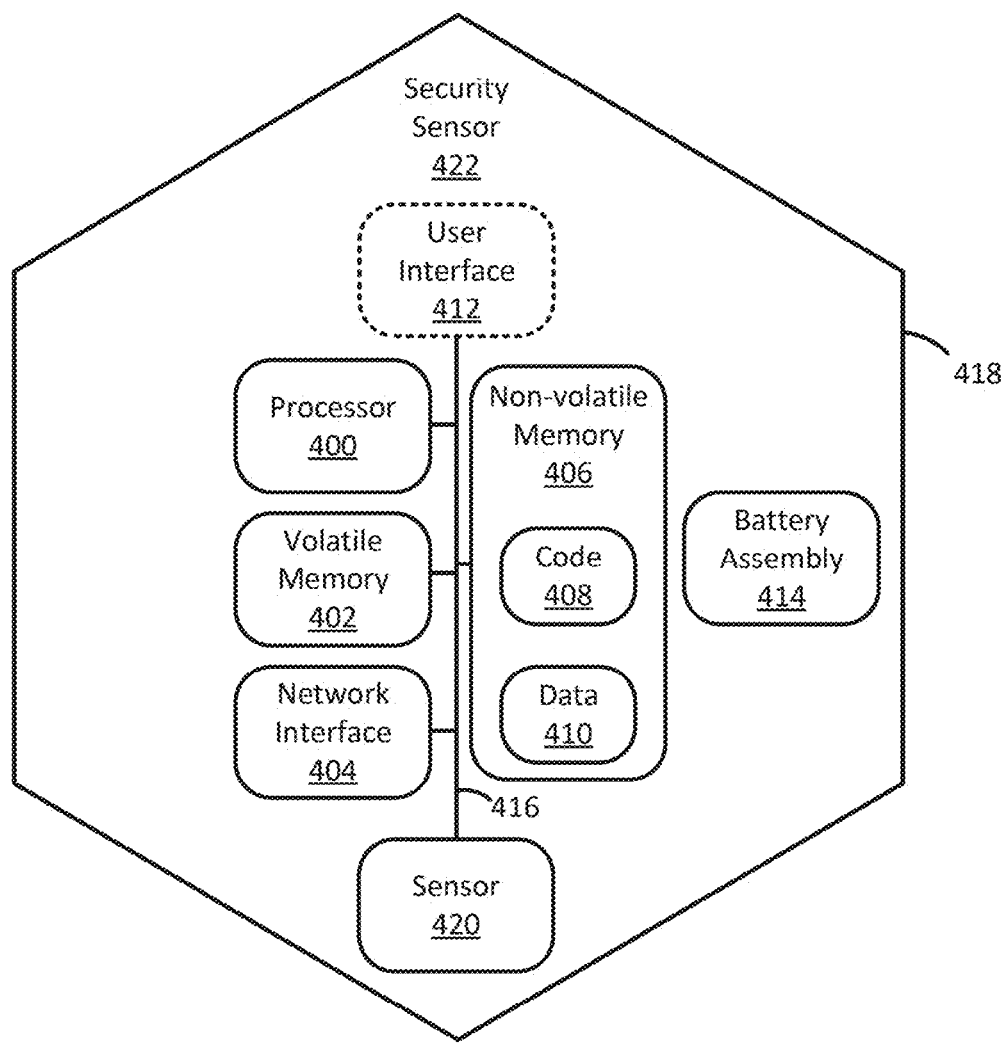
FIG. 4A is a schematic diagram of a security sensor, according to some examples described herein.

Turning now to FIG. 4A, an example security sensor 422 is schematically illustrated. Particular configurations of the security sensor 422 (e.g., the image capture devices 104 and 110, the motion sensor assembly 112, and the contact sensor assemblies 106) are illustrated in FIG. 1 and described above. As shown in FIG. 4A, the security sensor 422 includes at least one processor 400, volatile memory 402, non-volatile memory 406, at least one network interface 404, a battery assembly 414, an interconnection mechanism 416, and at least one sensor assembly 420. The non-volatile memory 406 stores executable code 408 and a data store 410. Some examples include a user interface 412. In certain examples illustrated by FIG. 4A, the features of the security sensor 422 enumerated above are incorporated within, or are a part of, a housing 418.

In some examples, the respective descriptions of the processor 200, the volatile memory 202, the non-volatile memory 206, the interconnection mechanism 216, and the battery assembly 214 with reference to the base station 114 are applicable to the processor 400, the volatile memory 402, the non-volatile memory 406, the interconnection mechanism 416, and the battery assembly 414 with reference to the security sensor 422. As such, those descriptions will not be repeated.

Continuing with the example of FIG. 4A, through execution of the code 408, the processor 400 can control operation of the network interface 404. In some examples, the network interface 404 includes one or more physical interfaces (e.g., a radio (including an antenna), an ethernet port, a USB port, etc.) and a software stack including drivers and/or other code 408 that is configured to communicate with the one or more physical interfaces to support one or more LAN, PAN, and/or WAN standard communication protocols. The communication protocols can include, for example, TCP, UDP, HTTP, and MQTT among others. As such, the network interface 404 enables the security sensor 422 to access and communicate with other computing devices (e.g., the other location-based devices) via a computer network (e.g., the LAN established by the router 116 and/or a point-to-point connection). For instance, in at least one example, when executing the code 408, the processor 400 controls the network interface to stream (e.g., via UDP) sensor data acquired from the sensor assembly 420 to the base station 114. Alternatively or additionally, in at least one example, through execution of the code 408, the processor 400 can control the network interface 404 to enter a power conservation mode by powering down a 2.4 GHz radio and powering up a sub-GHz radio that are both included in the network interface 404. In this example, through execution of the code 408, the processor 400 can control the network interface 404 to enter a streaming or interactive mode by powering up a 2.4 GHz radio and powering down a sub-GHz radio, for example, in response to receiving a wake signal from the base station via the sub-GHz radio.

Continuing with the example of FIG. 4A, through execution of the code 408, the processor 400 can control operation of the user interface 412. In some examples, the user interface 412 includes user input and/or output devices (e.g., physical buttons, a touchscreen, a display, a speaker, a camera, an accelerometer, a biometric scanner, an environmental sensor, one or more LEDs, etc.) and a software stack including drivers and/or other code 408 that is configured to communicate with the user input and/or output devices. As such, the user interface 412 enables the security sensor 422 to interact with users to receive input and/or render output. This rendered output can include, for instance, one or more GUIs including one or more controls configured to display output and/or receive input. The input can specify values to be stored in the data store 410. The output can indicate values stored in the data store 410. It should be noted that, in some examples, parts of the user interface 412 are accessible and/or visible as part of, or through, the housing 418.

Continuing with the example of FIG. 4A, the sensor assembly 420 can include one or more types of sensors, such as the sensors described above with reference to the image capture devices 104 and 110, the motion sensor assembly 112, and the contact sensor assembly 106 of FIG. 1, or other types of sensors. For instance, in at least one example, the sensor assembly 420 includes an image sensor (e.g., a charge-coupled device or an active-pixel sensor) and/or a temperature or thermographic sensor (e.g., an active and/or passive infrared (PIR) sensor). Regardless of the type of sensor or sensors housed, the processor 400 can (e.g., via execution of the code 408) acquire sensor data from the housed sensor and stream the acquired sensor data to the processor 400 for communication to the base station.

It should be noted that, in some examples of the devices 108 and 422, the operations executed by the processors 300 and 400 while under control of respective control of the code 308 and 408 may be hardcoded and/or implemented in hardware, rather than as a combination of hardware and software. Moreover, execution of the code 408 can implement the camera agent 138 of FIG. 1 and can result in manipulated data that is a part of the data store 410.

Figure 4B:
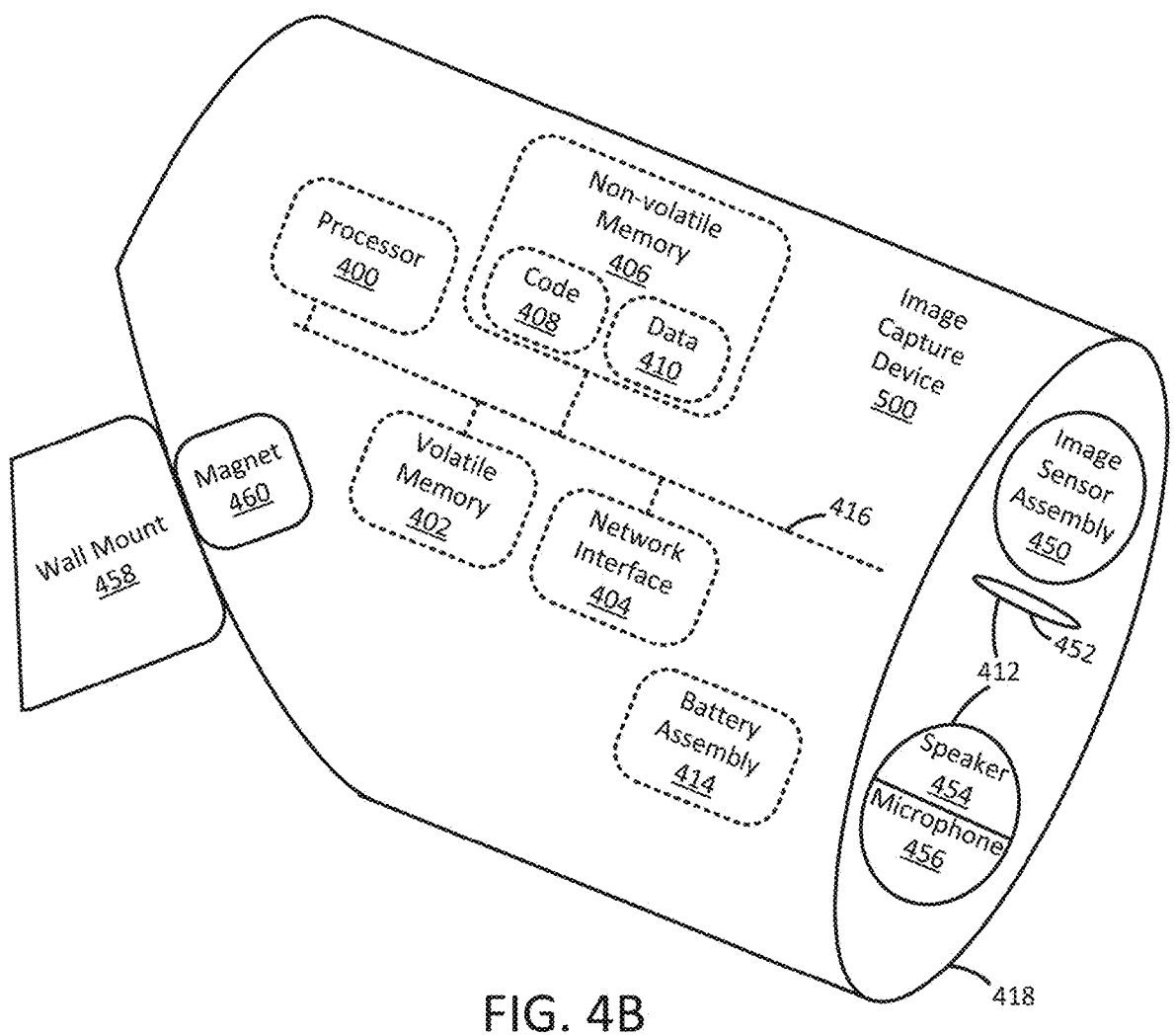
FIG. 4B is a schematic diagram of an image capture device, according to some examples described herein.

Turning now to FIG. 4B, an example image capture device 500 is schematically illustrated. Particular configurations of the image capture device 500 (e.g., the image capture devices 104 and 110) are illustrated in FIG. 1 and described above. As shown in FIG. 4B, the image capture device 500 includes at least one processor 400, volatile memory 402, non-volatile memory 406, at least one network interface 404, a battery assembly 414, and an interconnection mechanism 416. These features of the image capture device 500 are illustrated in dashed lines to indicate that they reside within a housing 418. The non-volatile memory 406 stores executable code 408 and a data store 410.

Some examples further include an image sensor assembly 450, a light 452, a speaker 454, a microphone 456, a wall mount 458, and a magnet 460. The image sensor assembly 450 may include a lens and an image sensor (e.g., a charge-coupled device or an active-pixel sensor) and/or a temperature or thermographic sensor (e.g., an active and/or passive infrared (PIR) sensor). The light 452 may include a light emitting diode (LED), such as a red-green-blue emitting LED. The light 452 may also include an infrared emitting diode in some examples. The speaker 454 may include a transducer configured to emit sound in the range of 60 dB to 80 dB or louder. Further, in some examples, the speaker 454 can include a siren configured to emit sound in the range of 70 dB to 90 db or louder. The microphone 456 may include a micro electro-mechanical system (MEMS) microphone. The wall mount 458 may include a mounting bracket, configured to accept screws or other fasteners that adhere the bracket to a wall, and a cover configured to mechanically couple to the mounting bracket. In some examples, the cover is composed of a magnetic material, such as aluminum or stainless steel, to enable the magnet 460 to magnetically couple to the wall mount 458, thereby holding the image capture device 500 in place.

In some examples, the respective descriptions of the processor 400, the volatile memory 402, the network interface 404, the non-volatile memory 406, the code 408 with respect to the network interface 404, the interconnection mechanism 416, and the battery assembly 414 with reference to the security sensor 422 are applicable to these same features with reference to the image capture device 500. As such, those descriptions will not be repeated here.

Continuing with the example of FIG. 4B, through execution of the code 408, the processor 400 can control operation of the image sensor assembly 450, the light 452, the speaker 454, and the microphone 456. For instance, in at least one example, when executing the code 408, the processor 400 controls the image sensor assembly 450 to acquire sensor data, in the form of image data, to be stream to the base station 114 (or one of the processes 130, 128, or 132 of FIG. 1) via the network interface 404. Alternatively or additionally, in at least one example, through execution of the code 408, the processor 400 controls the light 452 to emit light so that the image sensor assembly 450 collects sufficient reflected light to compose the image data. Further, in some examples, through execution of the code 408, the processor 400 controls the speaker 454 to emit sound. This sound may be locally generated (e.g., a sonic alert via the siren) or streamed from the base station 114 (or one of the processes 130, 128 or 132 of FIG. 1) via the network interface 404 (e.g., utterances from the user or monitoring personnel). Further still, in some examples, through execution of the code 408, the processor 400 controls the microphone 456 to acquire sensor data in the form of sound for streaming to the base station 114 (or one of the processes 130, 128 or 132 of FIG. 1) via the network interface 404.

It should be appreciated that in the example of FIG. 4B, the light 452, the speaker 454, and the microphone 456 implement an instance of the user interface 412 of FIG. 4A. It should also be appreciated that the image sensor assembly 450 and the light 452 implement an instance of the sensor assembly 420 of FIG. 4A. As such, the image capture device 500 illustrated in FIG. 4B is at least one example of the security sensor 422 illustrated in FIG. 4A. The image capture device 500 may be a battery-powered outdoor sensor configured to be installed and operated in an outdoor environment, such as outside a home, office, store, or other commercial or residential building, for example.

Figure 4C:
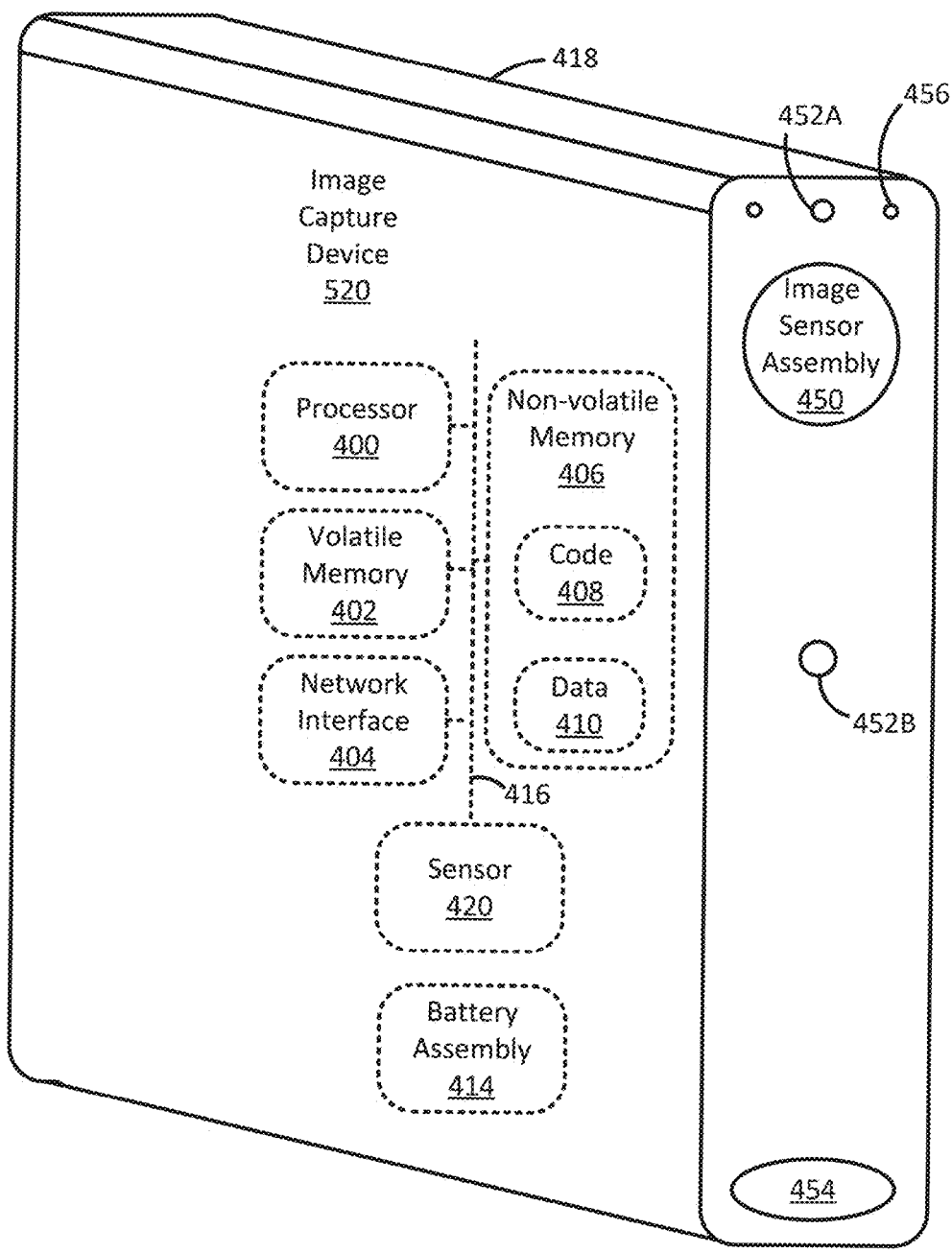
FIG. 4C is a schematic diagram of another image capture device, according to some examples described herein.

Turning now to FIG. 4C, another example image capture device 520 is schematically illustrated. Particular configurations of the image capture device 520 (e.g., the image capture devices 104 and 110) are illustrated in FIG. 1 and described above. As shown in FIG. 4C, the image capture device 520 includes at least one processor 400, volatile memory 402, non-volatile memory 406, at least one network interface 404, a battery assembly 414, and an interconnection mechanism 416. These features of the image capture device 520 are illustrated in dashed lines to indicate that they reside within a housing 418. The non-volatile memory 406 stores executable code 408 and a data store 410. The image capture device 520 further includes an image sensor assembly 450, a speaker 454, and a microphone 456 as described above with reference to the image capture device 500 of FIG. 4B.

In some examples, the image capture device 520 further includes lights 452A and 452B. The light 452A may include a light emitting diode (LED), such as a red-green-blue emitting LED. The light 452B may also include an infrared emitting diode to enable night vision in some examples.

It should be appreciated that in the example of FIG. 4C, the lights 452A and 452B, the speaker 454, and the microphone 456 implement an instance of the user interface 412 of FIG. 4A. It should also be appreciated that the image sensor assembly 450 and the light 452 implement an instance of the sensor assembly 420 of FIG. 4A. As such, the image capture device 520 illustrated in FIG. 4C is at least one example of the security sensor 422 illustrated in FIG. 4A. The image capture device 520 may be a battery-powered indoor sensor configured to be installed and operated in an indoor environment, such as within a home, office, store, or other commercial or residential building, for example.

Figure 5:
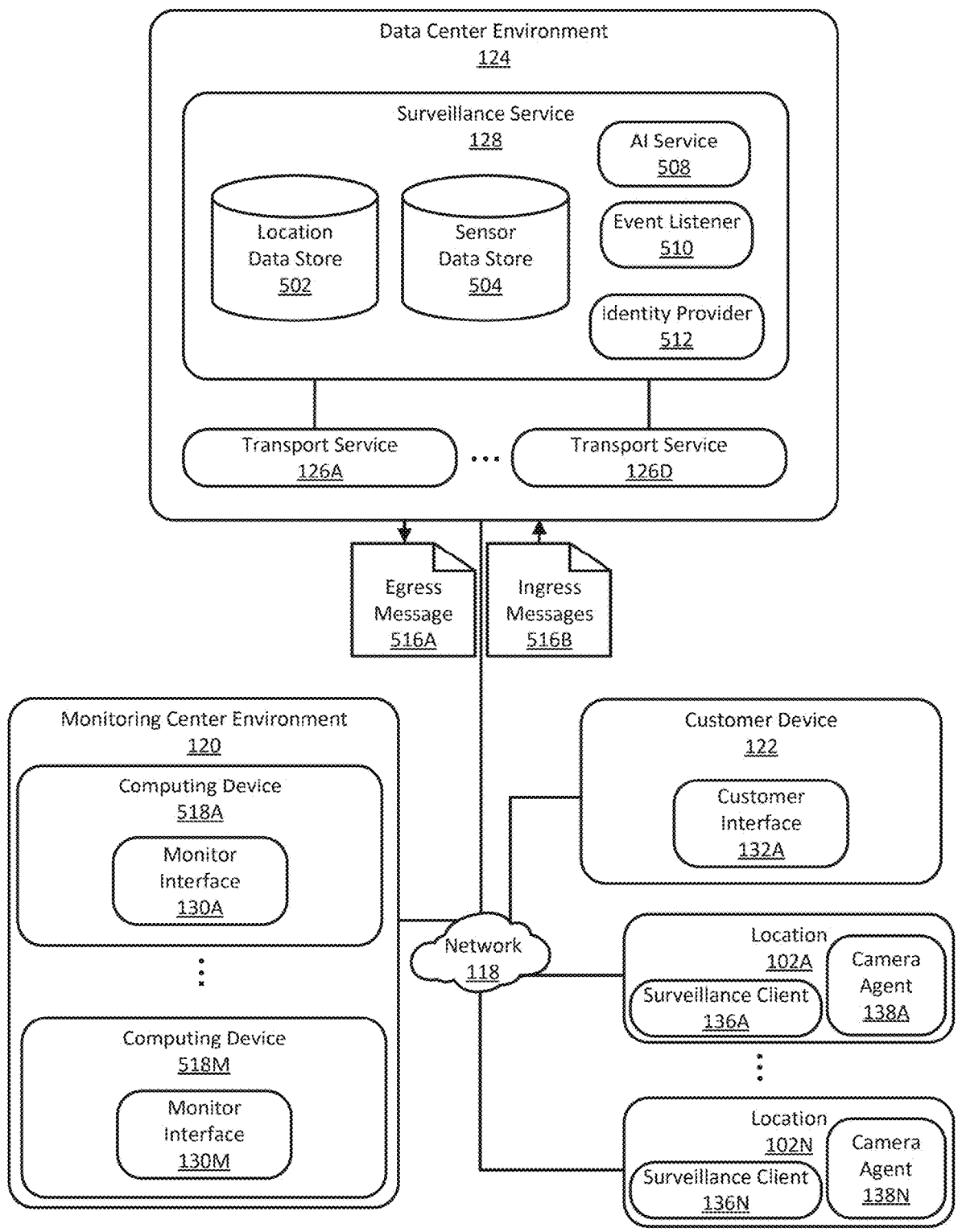
FIG. 5 is a schematic diagram of a data center environment, a monitoring center environment, and a customer device, according to some examples described herein.

Turning now to FIG. 5, aspects of the data center environment 124 of FIG. 1, the monitoring center environment 120 of FIG. 1, one of the customer devices 122 of FIG. 1, the network 118 of FIG. 1, and a plurality of monitored locations 102A of FIG. 1 through 102N (collectively referred to as the locations 102) are schematically illustrated. As shown in FIG. 5, the data center environment 124 hosts the surveillance service 128 and the transport services 126 (individually referred to as the transport services 126A through 126D). The surveillance service 128 includes a location data store 502, a sensor data store 504, an artificial intelligence (AI) service 508, an event listening service 510, and an identity provider 512. The monitoring center environment 120 includes computing devices 518A through 518M (collectively referred to as the computing devices 518) that host monitor interfaces 130A through 130M. Individual locations 102A through 102N include base stations (e.g., the base station 114 of FIG. 1, not shown) that host the surveillance clients 136A through 136N (collectively referred to as the surveillance clients 136) and image capture devices (e.g., the image capture device 110 of FIG. 1, not shown) that host the software camera agents 138A through 138N (collectively referred to as the camera agents 138).

As shown in FIG. 5, the transport services 126 are configured to process ingress messages 516B from the customer interface 132A, the surveillance clients 136, the camera agents 138, and/or the monitor interfaces 130. The transport services 126 are also configured to process egress messages 516A addressed to the customer interface 132A, the surveillance clients 136, the camera agents 138, and the monitor interfaces 130. The location data store 502 is configured to store, within a plurality of records, location data in association with identifiers of customers for whom the location is monitored. For example, the location data may be stored in a record with an identifier of a customer and/or an identifier of the location to associate the location data with the customer and the location. The sensor data store 504 is configured to store, within a plurality of records, sensor data (e.g., one or more frames of image data) in association with identifiers of locations and timestamps at which the sensor data was acquired.

Continuing with the example of FIG. 5, the AI service 508 is configured to process sensor data (e.g., images and/or sequences of images) to identify movement, human faces, and other features within the sensor data. The event listening service 510 is configured to scan location data transported via the ingress messages 516B for event data and, where event data is identified, execute one or more event handlers to process the event data. In some examples, the event handlers can include an event reporter that is configured to identify reportable events and to communicate messages specifying the reportable events to one or more recipient processes (e.g., a customer interface 132 and/or a monitor interface 130). In some examples, the event listening service 510 can interoperate with the AI service 508 to identify events from sensor data. The identity provider 512 is configured to receive, via the transport services 126, authentication requests from the surveillance clients 136 or the camera agents 138 that include security credentials. When the identity provider 512 can authenticate the security credentials in a request (e.g., via a validation function, cross-reference look-up, or some other authentication process), the identity provider 512 can communicate a security token in response to the request. A surveillance client 136 or a camera agent 138 can receive, store, and include the security token in subsequent ingress messages 516B, so that the transport service 126A is able to securely process (e.g., unpack/parse) the packages included in the ingress messages 516B to extract the location data prior to passing the location data to the surveillance service 128.

Continuing with the example of FIG. 5, the transport services 126 are configured to receive the ingress messages 516B, verify the authenticity of the messages 516B, parse the messages 516B, and extract the location data encoded therein prior to passing the location data to the surveillance service 128 for processing. This location data can include any of the location data described above with reference to FIG. 1. Individual transport services 126 may be configured to process ingress messages 516B generated by location-based monitoring equipment of a particular manufacturer and/or model. The surveillance clients 136 and the camera agents 138 are configured to generate and communicate, to the surveillance service 128 via the network 118, ingress messages 516B that include packages of location data based on sensor information received at the locations 102.

Continuing with the example of FIG. 5, the computing devices 518 are configured to host the monitor interfaces 130. In some examples, individual monitor interfaces 130A-130M are configured to render GUIs including one or more image frames and/or other sensor data. In certain examples, the customer device 122 is configured to host the customer interface 132. In some examples, customer interface 132 is configured to render GUIs including one or more image frames and/or other sensor data. Additional features of the monitor interfaces 130 and the customer interface 132 are described further below with reference to FIG. 6.

Figure 6:
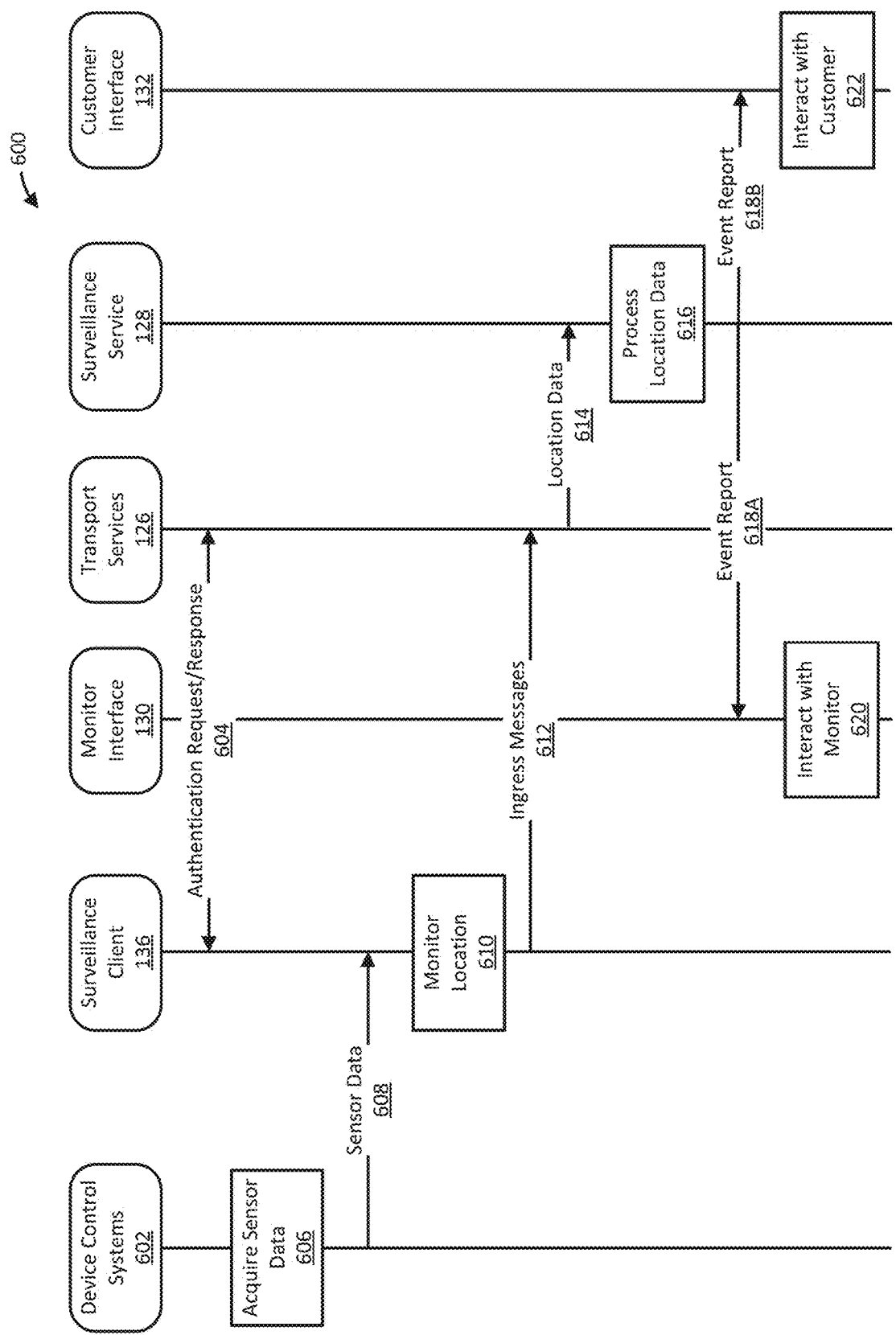
FIG. 6 is a sequence diagram of a monitoring process, according to some examples described herein.

Turning now to FIG. 6, a monitoring process 600 is illustrated as a sequence diagram. The process 600 can be executed, in some examples, by a security system (e.g., the security system 100 of FIG. 1). More specifically, in some examples, at least a portion of the process 600 is executed by the location-based devices under the control of device control system (DCS) code (e.g., either the code 308 or 408) implemented by at least one processor (e.g., either of the processors 300 or 400 of FIGS. 3-4C). The DCS code can include, for example, a camera agent (e.g., the camera agent 138 of FIG. 1). At least a portion of the process 600 is executed by a base station (e.g., the base station 114 of FIG. 1) under control of a surveillance client (e.g., the surveillance client 136 of FIG. 1). At least a portion of the process 600 is executed by a monitoring center environment (e.g., the monitoring center environment 120 of FIG. 1) under control of a monitor interface (e.g., the monitor interface 130 of FIG. 1). At least a portion of the process 600 is executed by a data center environment (e.g., the data center environment 124 of FIG. 1) under control of a surveillance service (e.g., the surveillance service 128 of FIG. 1) or under control of transport services (e.g., the transport services 126 of FIG. 1). At least a portion of the process 600 is executed by a customer device (e.g., the customer device 122 of FIG. 1) under control of a customer interface (e.g., customer interface 132 of FIG. 1).

As shown in FIG. 6, the process 600 starts with the surveillance client 136 authenticating with an identity provider (e.g., the identity provider 512 of FIG. 5) by exchanging one or more authentication requests and responses 604 with the transport service 126. More specifically, in some examples, the surveillance client 136 communicates an authentication request to the transport service 126 via one or more API calls to the transport service 126. In these examples, the transport service 126 parses the authentication request to extract security credentials therefrom and passes the security credentials to the identity provider for authentication. In some examples, if the identity provider authenticates the security credentials, the transport service 126 receives a security token from the identity provider and communicates the security token as a payload within an authentication response to the authentication request. In these examples, if the identity provider is unable to authenticate the security credentials, the transport service 126 generates an error code and communicates the error code as the payload within the authentication response to the authentication request. Upon receipt of the authentication response, the surveillance client 136 parses the authentication response to extract the payload. If the payload includes the error code, the surveillance client 136 can retry authentication and/or interoperate with a user interface of its host device (e.g., the user interface 212 of the base station 114 of FIG. 2) to render output indicating the authentication failure. If the payload includes the security token, the surveillance client 136 stores the security token for subsequent use in communication of location data via ingress messages. It should be noted that the security token can have a limited lifespan (e.g., 1 hour, 1 day, 1 week, 1 month, etc.) after which the surveillance client 136 may be required to reauthenticate with the transport services 126.

Continuing with the process 600, one or more DCSs 602 hosted by one or more location-based devices acquire 606 sensor data descriptive of a location (e.g., the location 102A of FIG. 1). The sensor data acquired can be any of a variety of types, as discussed above with reference to FIGS. 1-4. In some examples, one or more of the DCSs 602 acquire sensor data continuously. In some examples, one or more of the DCSs 602 acquire sensor data in response to an event, such as expiration of a local timer (a push event) or receipt of an acquisition polling signal communicated by the surveillance client 136 (a poll event). In certain examples, one or more of the DCSs 602 stream sensor data to the surveillance client 136 with minimal processing beyond acquisition and digitization. In these examples, the sensor data may constitute a sequence of vectors with individual vector members including a sensor reading and a timestamp. Alternatively or additionally, in some examples, one or more of the DCSs 602 execute additional processing of sensor data, such as generation of one or more summaries of multiple sensor readings. Further still, in some examples, one or more of the DCSs 602 execute sophisticated processing of sensor data. For instance, if the security sensor includes an image capture device, the security sensor may execute image processing routines such as edge detection, motion detection, facial recognition, threat assessment, and reportable event generation.

Continuing with the process 600, the DCSs 602 communicate the sensor data 608 to the surveillance client 136. As with sensor data acquisition, the DCSs 602 can communicate the sensor data 608 continuously or in response to an event, such as a push event (originating with the DCSs 602) or a poll event (originating with the surveillance client 136).

Continuing with the process 600, the surveillance client 136 monitors 610 the location by processing the received sensor data 608. For instance, in some examples, the surveillance client 136 executes one or more image processing routines. These image processing routines may include any of the image processing routines described above with reference to the operation 606. By distributing at least some of the image processing routines between the DCSs 602 and surveillance clients 136, some examples decrease power consumed by battery-powered devices by off-loading processing to line-powered devices. Moreover, in some examples, the surveillance client 136 may execute an ensemble threat detection process that utilizes sensor data 608 from multiple, distinct DCSs 602 as input. For instance, in at least one example, the surveillance client 136 will attempt to corroborate an open state received from a contact sensor with motion and facial recognition processing of an image of a scene including a window to which the contact sensor is affixed. If two or more of the three processes indicate the presence of an intruder, the threat score is increased and or a break-in event is declared, locally recorded, and communicated. Other processing that the surveillance client 136 may execute includes outputting local alerts (e.g., in response to detection of particular events and/or satisfaction of other criteria) and detection of maintenance conditions for location-based devices, such as a need to change or recharge low batteries and/or replace/maintain the devices that host the DCSs 602. Any of the processes described above within the operation 610 may result in the creation of location data that specifies the results of the processes.

Continuing with the process 600, the surveillance client 136 communicates the location data 614 to the surveillance service 128 via one or more ingress messages 612 to the transport services 126. As with sensor data 608 communication, the surveillance client 136 can communicate the location data 614 continuously or in response to an event, such as a push event (originating with the surveillance client 136) or a poll event (originating with the surveillance service 128).

Continuing with the process 600, the surveillance service 128 processes 616 received location data. For instance, in some examples, the surveillance service 128 executes one or more routines described above with reference to the operations 606 and/or 610. Additionally or alternatively, in some examples, the surveillance service 128 calculates a threat score or further refines an existing threat score using historical information associated with the location identified in the location data and/or other locations geographically proximal to the location (e.g., within the same zone improvement plan (ZIP) code). For instance, in some examples, if multiple break-ins have been recorded for the location and/or other locations within the same ZIP code within a configurable time span including the current time, the surveillance service 128 may increase a threat score calculated by a DCS 602 and/or the surveillance client 136. In some examples, the surveillance service 128 determines, by applying a set of rules and criteria to the location data 614, whether the location data 614 includes any reportable event data and, if so, communicates an event report 618A and/or 618B to the monitor interface 130 and/or the customer interface 132. A reportable event may be an event of a certain type (e.g., break-in) or an event of a certain type that satisfies additional criteria (e.g., movement within a particular zone combined with a threat score that exceeds a threshold value). The event reports 618A and/or 618B may have a priority based on the same criteria used to determine whether the event reported therein is reportable or may have a priority based on a different set of criteria or rules.

Continuing with the process 600, the monitor interface 130 interacts 620 with monitoring personnel through, for example, one or more GUIs. These GUIs may provide details and context regarding one or more reportable events.

Continuing with the process 600, the customer interface 132 interacts 622 with at least one customer through, for example, one or more GUIs. These GUIs may provide details and context regarding one or more reportable events.

It should be noted that the processing of sensor data and/or location data, as described above with reference to the operations 606, 610, and 616, may be executed by processors disposed within various parts of the system 100. For instance, in some examples, the DCSs 602 execute minimal processing of the sensor data (e.g., acquisition and streaming only) and the remainder of the processing described above is executed by the surveillance client 136 and/or the surveillance service 128. This approach may be helpful to prolong battery runtime of location-based devices. In other examples, the DCSs 602 execute as much of the sensor data processing as possible, leaving the surveillance client 136 and the surveillance service 128 to execute only processes that require sensor data that spans location-based devices and/or locations. This approach may be helpful to increase scalability of the system 100 with regard to adding new locations.

Figure 7:
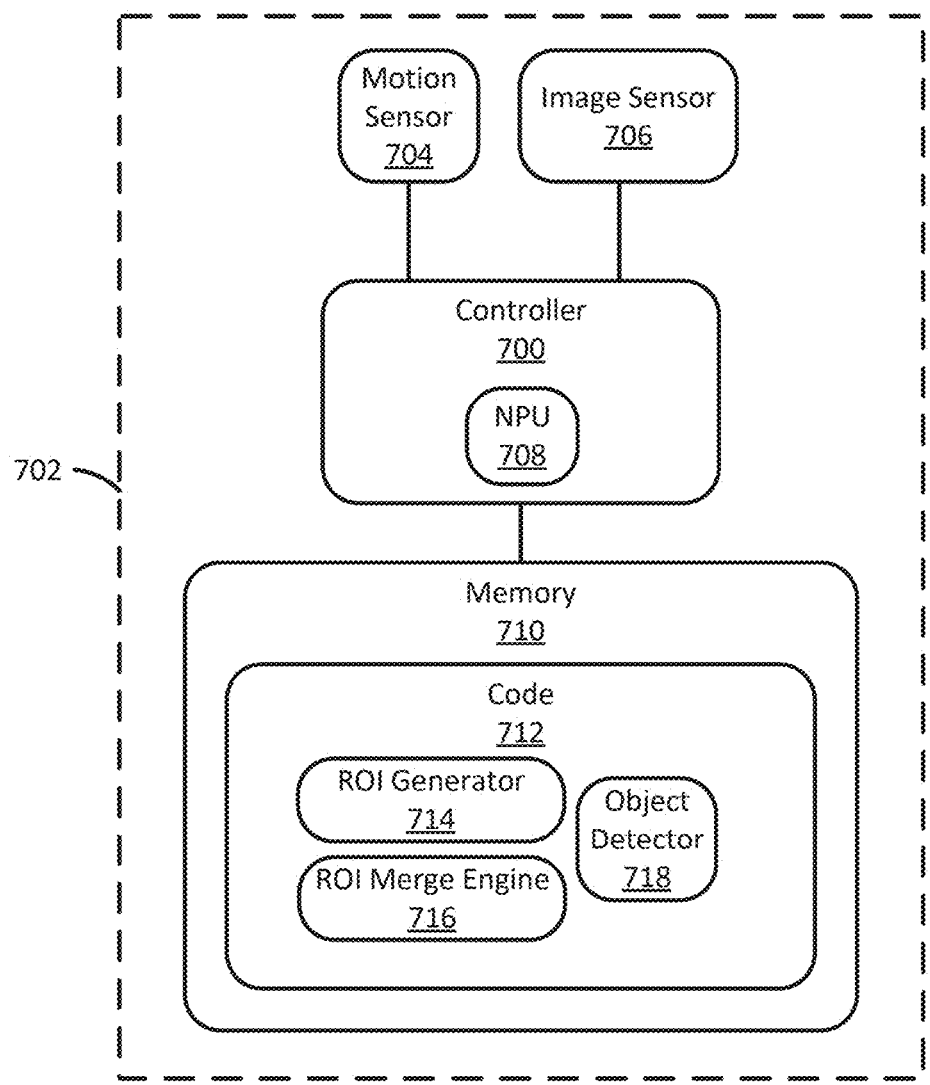
FIG. 7 is a schematic diagram of a security device according to some examples described herein.

Turning now to FIG. 7, there is illustrated an example of a security device 702 configured to implement various techniques disclosed herein. The security device 702 can be associated with a security system installed at a monitored location, as discussed above. The security device 702 includes a motion sensor 704, an image sensor 706, and a memory 710 that are electrically coupled to a controller 700. The controller 700 may include or may be implemented by one or more processors, such as the processor 400 discussed above, for example. The security device 702 may further include any of the componentry and functionality of the security sensor 422 and/or image capture devices 500 and 520 discussed above with reference to FIGS. 4A-4C. Accordingly, it will be understood that the security device 702 may include components not shown in FIG. 7.

In one example, the motion sensor 704 is a PIR motion sensor. In one example, the image sensor 706 is a digital camera that collects still image frames and/or video image frames constituting a video feed/stream. The image sensor 706 may include the image sensor assembly 450 discussed above with reference to FIGS. 4B and 4C. In one example, the controller 700 includes an NPU 708 for efficiently applying neural networks or other artificial intelligence models to execute aspects of motion detection and object detection processes based on the image frames captured by the image sensor 706, as discussed in more detail below. In one example, the memory 710 includes non-volatile, flash memory and stores code 712 that is executable by the controller 700. The memory 710 may include the non-volatile memory 406 discussed above with reference to FIGS. 4A-4C. The code 712 includes an ROI generator 714, an ROI merge engine 716, and an object detector 718, among other software programs. In some examples, the object detector 718 applies an artificial intelligence (AI) or machine learning (ML) model to a set of image data and generates output data that identifies an object within the image data and specifies a level of confidence that the identified object was correctly identified. Examples of AI models that can be applied by the object detector 718 include any from the YOLO family of models, which are available as part of the OpenAI package from the GitHub code repository. The processes that the code 712 is configured to execute through components of the security device 702 are described further below. The code 712 may include the code 408 discussed above with reference to FIGS. 4A-4C. The security device 702 may be a battery-powered indoor sensor configured to be installed and operated in an indoor environment, such as within a home, office, store, or other commercial or residential building, for example.

According to certain examples, the controller 700 and the motion sensor 704 operate in a low power state, or operating mode, in which the image sensor 706 (and optionally other components of the security device 702) is deactivated, until an event triggers the motion sensor 704. In the low power operating mode, the motion sensor 704 remains active, but components that generally consume more power, such as the image sensor 706, for example, are powered off. In the low power operating mode, the controller 700 performs minimal processing, sufficient to monitor for events that trigger the motion sensor 704 to conserve battery life and thus extend the time between battery changeouts. When the motion sensor 704 indicates motion and issues a signal or notification (e.g., sends motion trigger data to the controller 700), the controller 700 is placed into a normal operating mode, in which the image sensor 706 (along with other components of the security device 702 that are powered off in the low power state) is enabled. Thus, the motion sensor 704 acts as a mode "switch" that configures the security device 702 into the "full power" or normal operating mode only when necessary. In this manner, power can be conserved by operating the security device 702 in the low power mode, with various components powered off, until a potential event of interest is detected and thereby extending the device's operation lifecycle when using battery power.

Figure 8:
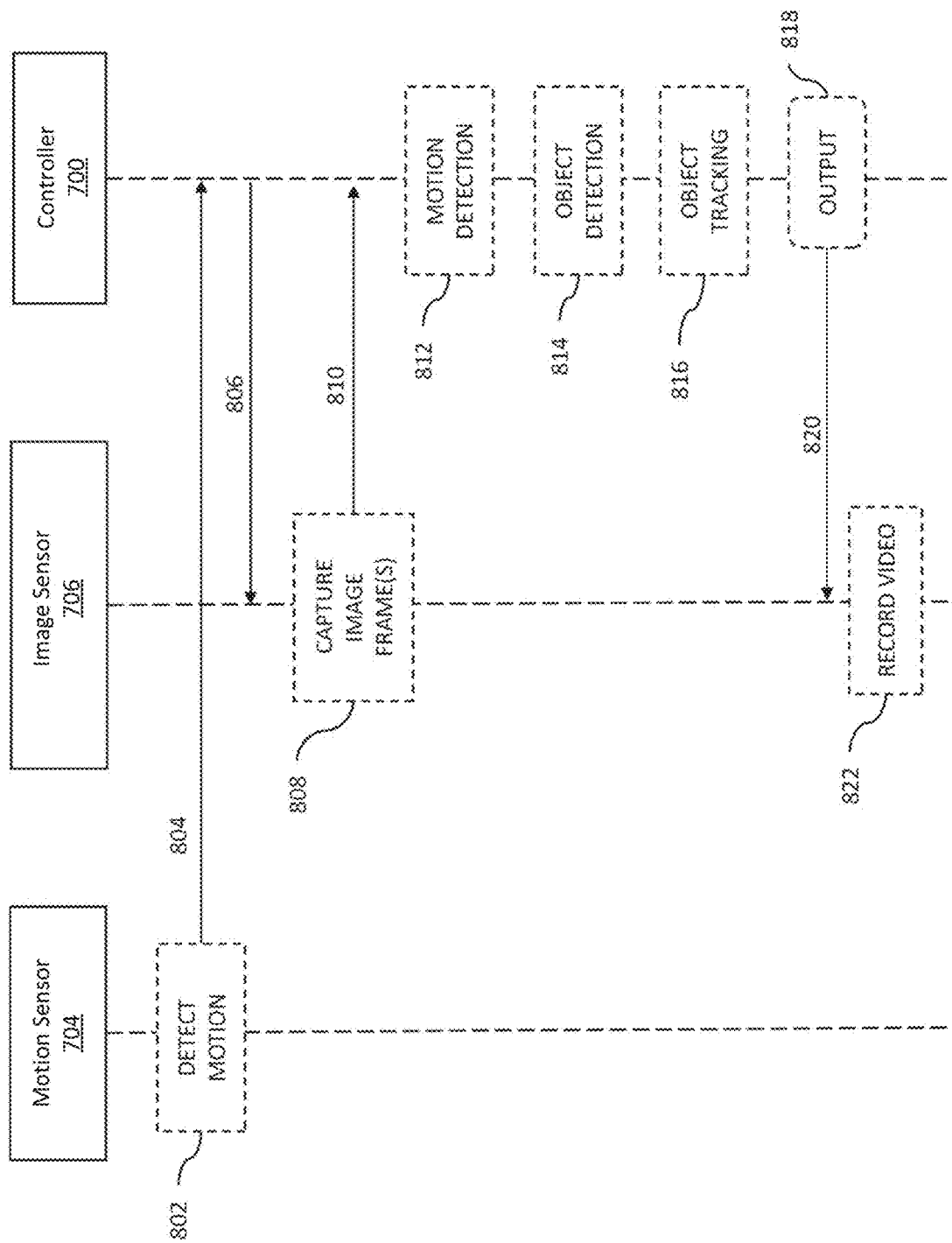
FIG. 8 is a sequence diagram of an operational process executed by features of the security device of FIG. 7, according to some examples described herein.

Referring to FIG. 8, there is illustrated a sequence diagram corresponding to an example of operation of the security device 702 of FIG. 7. With the security device 702 operating in the low power mode, the motion sensor 704 is active or otherwise powered on. At 802, the motion sensor 704 detects an event (e.g., an object in motion) and sends a signal (e.g., motion trigger signal) to the controller 700, as indicated at 804. As discussed above, in certain examples the motion sensor 704 is a PIR sensor that detects motion based on detected changes in temperature over its field of view. Accordingly, in some examples, the motion sensor 704 can be tuned to detect people and/or animals based on a known temperature range associated with the body temperatures of people/animals. The signal from the motion sensor 704 causes the code 712, which is being executed by the controller 700, to configure the security device 702 into the normal operating mode, which includes activating or enabling the image sensor 706, as indicated at 806. Once active, at 808, the image sensor 706 captures one or more frames of image data. In some examples, the image sensor 706 passes the frame(s) of image data ("images" or "image frames") to the controller 700 for processing, as indicated at 810. These frames of image data may be implemented as a two-dimensional array of pixel data ("pixels"). Other data structures and encoding standards for frames will be apparent in view of this disclosure.

According to certain examples, the controller 700 applies a motion detection process 812 that operates on captured frames of image data (e.g., from the image sensor 706) to detect instances of motion. In the example shown in FIG. 8, the process 812 is implemented by the controller 700. In examples, the controller 700 reads a single frame of image data at a time. In some examples, the controller 700 converts the frame to greyscale and resizes the frame for motion detection. In one example, the greyscale frame is resized (e.g., downsized) to 320×192 pixels for motion detection; however, in other examples, other frame sizes (e.g., 288× 288 pixels, 320×192 pixels) can be used. In some examples, downsizing the image frames may allow the images to be processed more quickly (e.g., using an artificial neural network (ANN)) and/or with less power consumption (which may be particularly beneficial for battery powered sensors) than if the process 812 was applied to full-size images captured by the image sensor 706.

It should be noted that, in some examples, the process 812 is implemented by a combination of the image sensor 706 and the controller 700. In these examples, the image sensor 706 obtains frames of image data and executes the preprocessing described above (e.g., converts to greyscale and/or resizes the frame). Further frames of image data can be acquired by the image sensor 706 as the process 812 continues and repeats various actions as discussed below.

Continuing with the process 812, the controller 700 operates on multiple frames (e.g., consecutive frames) of image data captured by the image sensor 706. In some examples of the process 812, the controller 700 locates where a moving object is in the field of view of the image sensor 706. The field of view of the image sensor 706 corresponds to the extent of the observable world that is "seen" (i.e., detected) at any given moment by the image sensor 706, which is generally the solid angle relative to the image sensor 706. In some examples, the solid angle defines an area through which a PIR sensor is sensitive to, and receives, electromagnetic radiation. Location of the object within the field of view can be determined using computer vision techniques. For example, there are existing foreground detection processes and/or background subtraction processes that can be used to locate moving objects in a frame of image data. These processes identify pixels that change between frames, and produce bounding boxes where the pixels have changed. The motion detection processes can be tuned to reject noise (e.g., by using thresholding to reject small differences between consecutive image frames). Thus, the output of the motion detection process 812 includes bounding boxes describing the location of detected motion within the scene. Examples of programmatic libraries that implement and expose motion detection processes include OpenCV, which is available on the GitHub code repository.

The controller 700 is further configured (optionally in combination with the image sensor 706) to implement an object detection process 814. In some examples, the motion detection process 812 and the object detection process 814 are executed concurrently via separate processing threads. In these examples, the motion detection process 812 may operate on image frames prior to the object detection process 814 and the object detection process 814 may skip some frames operated upon by the motion detection process, for example, to conserve computing resources. For instance, in some examples, the object detection process 814 is configured to operate on 1 to 10 frames per second, while the motion detection process 812 is configured to operate on 25 or more frames per second. In some examples, the object detection process 814 is configured to operate on 3 to 6 frames per second. In some examples, the object detection process 814 is configured to operate on 4 or 5 frames per second. A particular example of the object detection process 814 is illustrated in FIG. 9.

Figure 9:
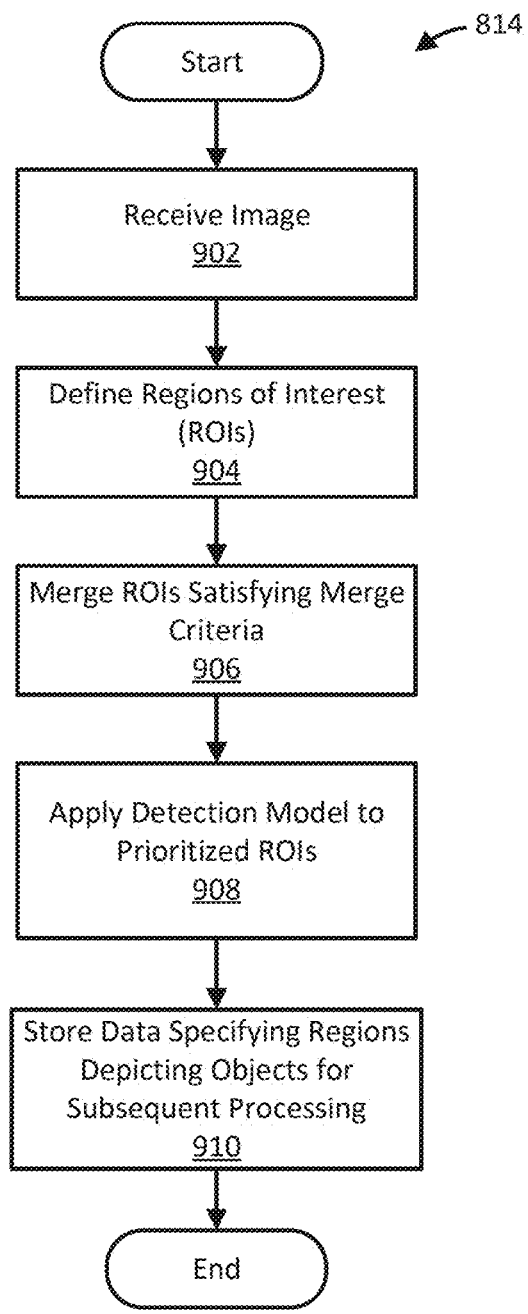
FIG. 9 is a flow diagram of an object detection process, according to some examples described herein.
Figure 12A:
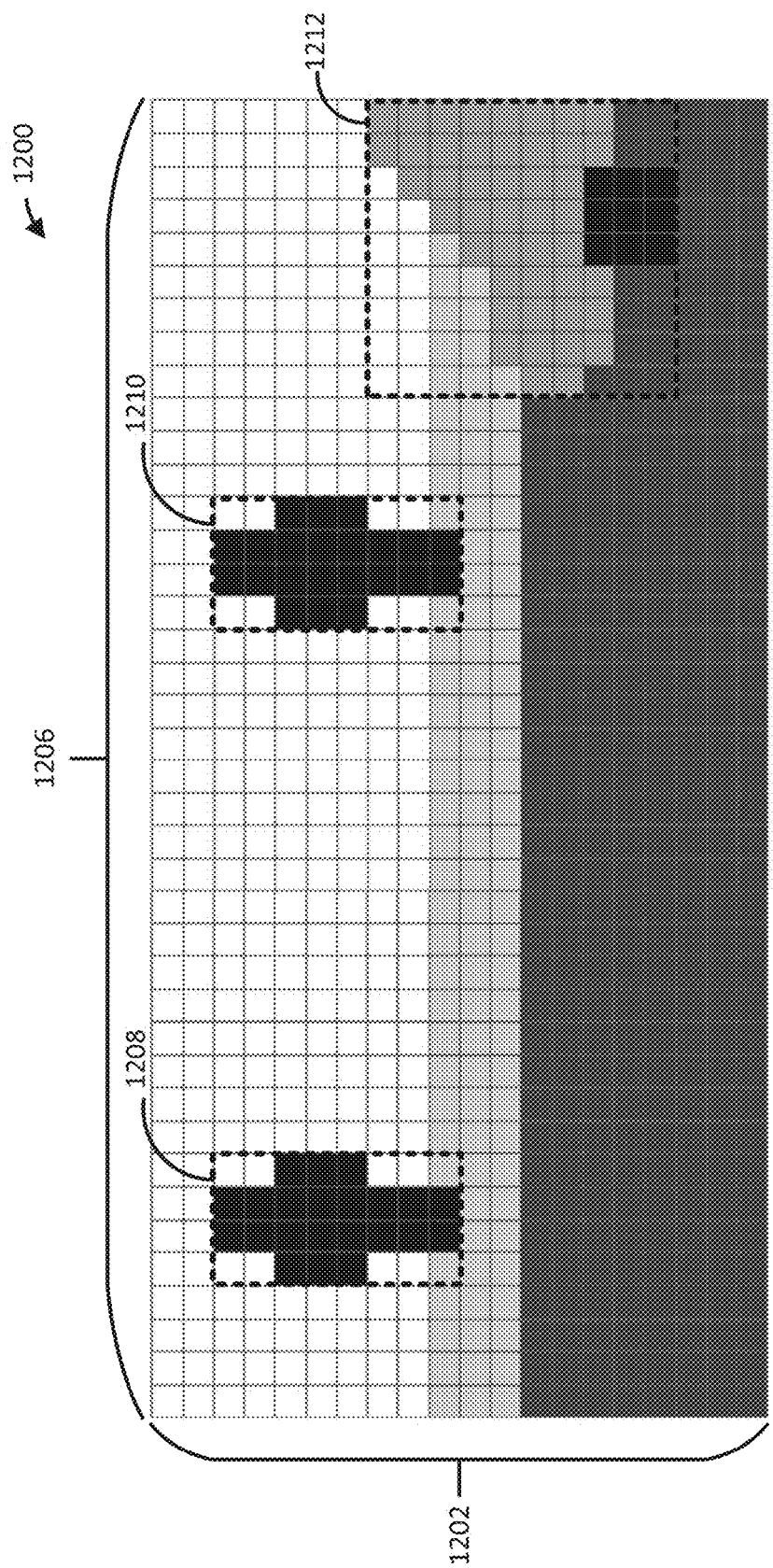
FIG. 12A is a diagram illustrating a frame of image data, according to some examples described herein.

As shown in FIG. 9, the object detection process 814 starts with a controller (e.g., the controller 700 of FIG. 7) receiving 902 a frame of image data from an image capture device (e.g., the image sensor 706 of FIG. 7). For instance, in some examples, the image capture device acquires a frame of image data that captures its field of view via a lens and associated circuitry and stores the frame in a buffer accessible by the controller. The size and format of the frame can vary between examples. For instance, in some examples, the frame is made up of 1920×1080 pixels encoded in in red-green-blue (RGB) color format. In other examples, the frame includes or 1536×1536 pixels. In one example, the RGB frame is resized (e.g., downsized or upsized) to 512× 288 pixels for object detection; however, in other examples, other frame sizes (e.g., 416×416 pixels, 150×150 pixels, etc.) can be used. FIG. 12A illustrates an example frame of image data 1200. As shown in FIG. 12A, the frame 1200 has two dimensions—a height 1202 and a width 1206.

Figure 10:
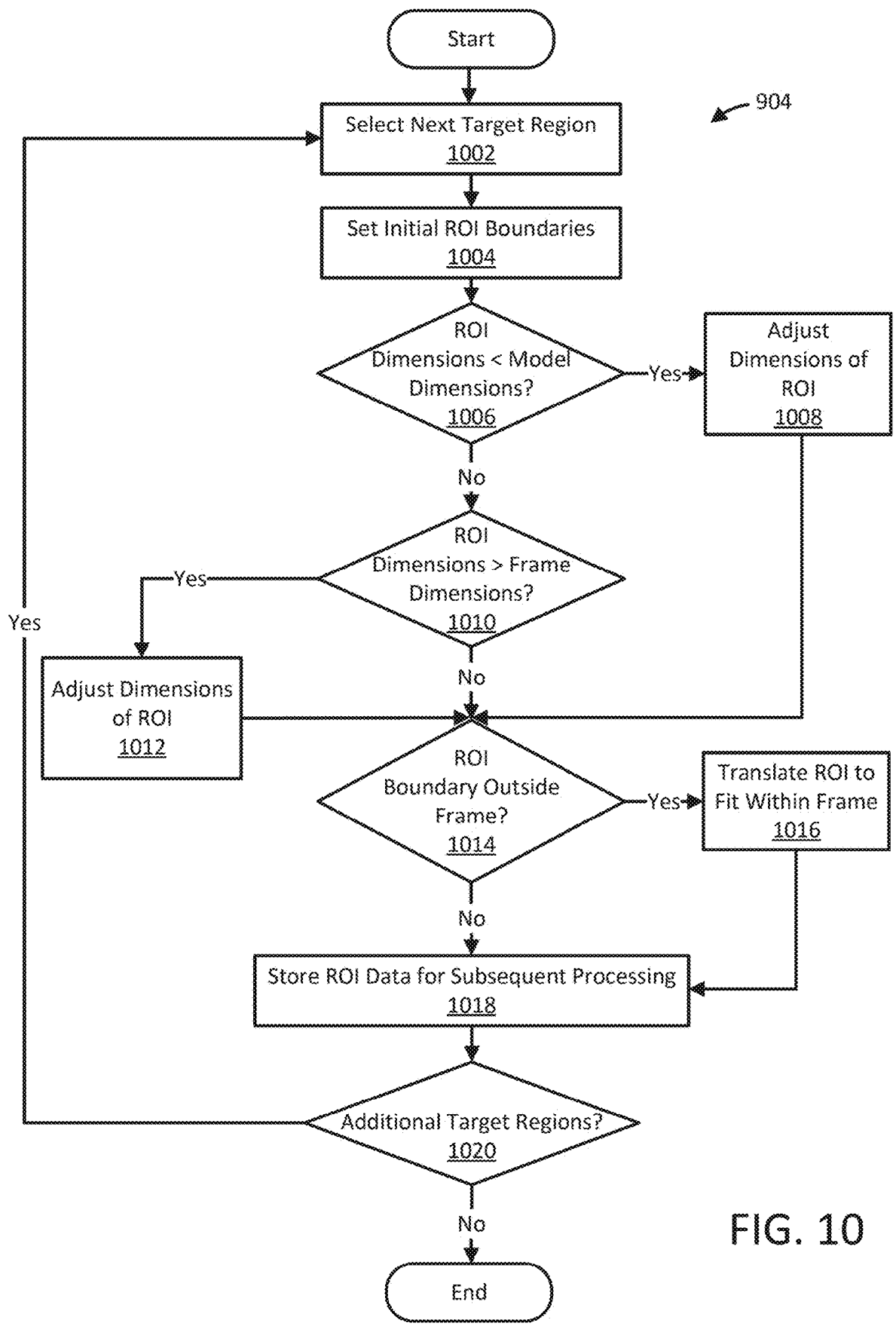
FIG. 10 is a flow diagram illustrating a region of interest (ROI) generation process, according to some examples described herein.

Continuing with the process 814, the controller defines 904 ROIs within the frame of image data. For instance, in some examples, the controller executes ROI generator code (e.g., the ROI generator 714 of FIG. 7) to define the ROIs. One example of an ROI generation process 904 is illustrated in FIG. 10. As shown in FIG. 10, the process 904 is iterative and may loop through two or more target regions prior to termination.

The process 904 starts with the controller selecting 1002 a region within the frame of image data to target for an ROI. For instance, in some examples, the controller selects a bounding box defined within the frame by a motion detection process (e.g., the motion detection process 812 described above with reference to FIG. 8) that has not yet been processed by the present iteration of the process 904 to be a target region that serves as a basis for the ROI. Alternatively or additionally, in some examples, the controller selects a bounding box identified by a previous iteration of an object detection process (e.g., the object detection process 814 described above with reference to FIG. 8) as the target region. As one illustration, the frame 1200 of FIG. 12A has three bounding boxes defined by the motion detection process, rectangles 1208, 1210, and 1212. The controller can select any one of these bounding boxes as the next target region within the operation 1002.

Figure 12B:
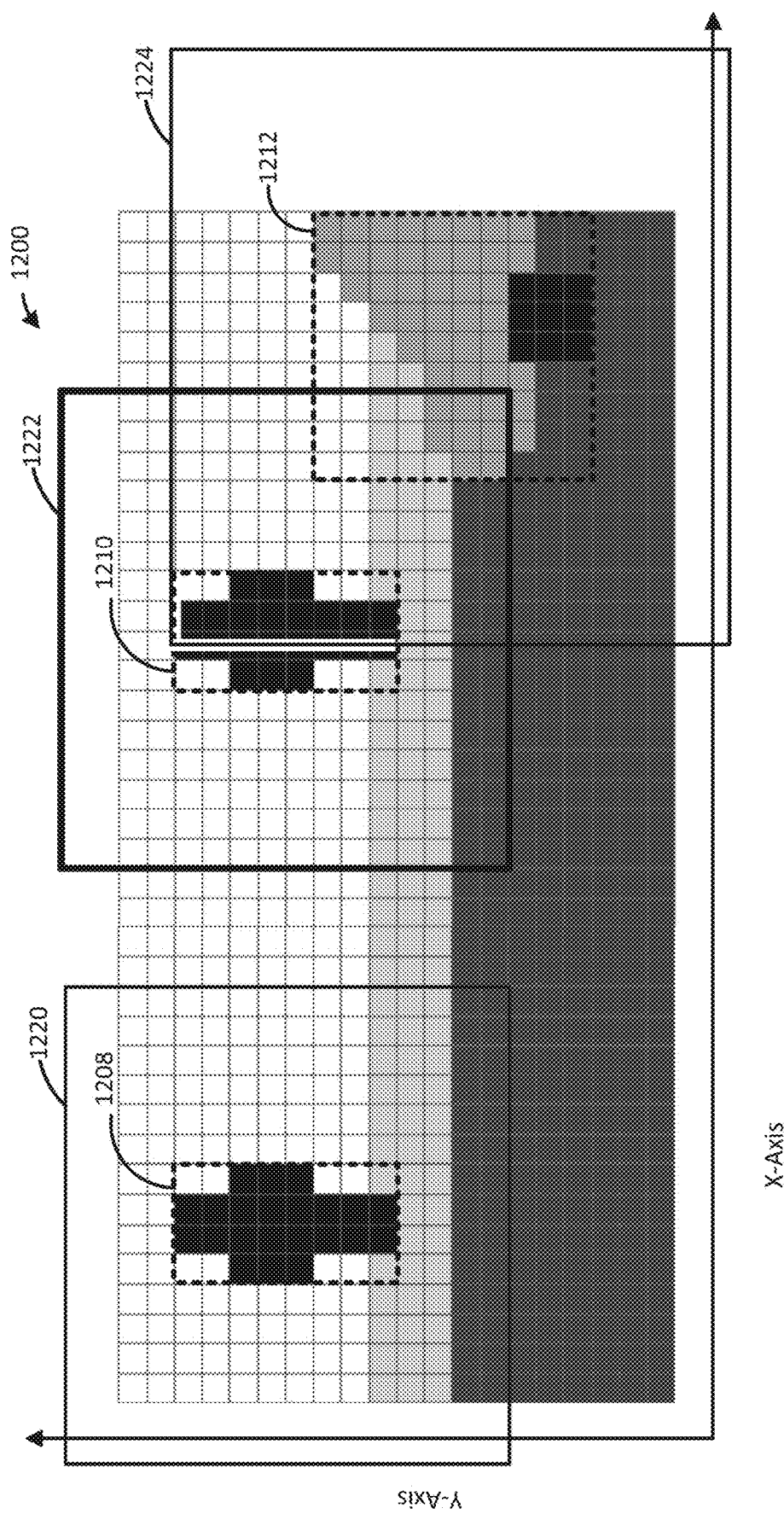
FIG. 12B is a diagram illustrating ROIs associated with the frame of image data of FIG. 12A, according to some examples described herein.

Continuing with the process 904, the controller sets 1004 initial boundaries of the ROI. For instance, in some examples, the controller sets the initial boundaries of the ROI with reference to the target region. In some examples, the controller selects initial ROI boundaries that center the target region within the ROI. Additionally or alternatively, in some examples, the controller selects initial boundaries for the ROI that include pixels that reside outside the target region. As has been discovered through empirical testing by applicant, these additional pixels may increase the accuracy with which objects within the target region are identified. For instance, in at least one example, the controller identifies the larger of the height and the width of the target region, multiplies the larger dimension by a factor of two, and uses the product for the height and the width of the ROI. Thus, in this example, the ROI has a square shape and is sized to include a number of pixels equal to the square of the larger dimension of the target region. This approach produces an ROI that is roughly twice the size of the target region. As one illustration, the frame 1200 of FIG. 12B has three square ROIs 1220, 1222, and 1224.

It should be noted that the examples described herein are not limited to ROIs having the shape and size described above. For instance, in some examples, ROIs can be shaped as rectangles, circles, or other shapes and can be sized to include various numbers of pixels. In these examples, the shapes and sizes of the ROIs may vary to better conform to model input. Additionally or alternatively, in other examples, the controller sets the initial dimensions of the ROI such that the target region is not centered within the ROI. Such an operation may allow the controller to skip a separate translation operation (e.g., operation 1016, which is described below). It should be noted that, in some instances, the initial boundaries of the ROI may extend beyond the frame of image data, for example where a target region is positioned close to an edge of the frame or is of sufficient size to generate a large ROI. As one illustration that can be seen with reference to FIG. 12B, the ROIs 1220, 1222, and 1224 have boundaries that reside both inside and outside of the frame 1200.

Continuing with the process 904, the controller determines 1006 whether the dimensions of the ROI are less than the dimensions of a model trained to detect objects within an image. For instance, in some examples, an object detector (e.g., the object detector 718 of FIG. 7) is configured to receive, as input for an ANN, a two-dimensional array of RBG pixels that has a height and width (e.g., a predefined height and width). In these examples, the controller compares the height and width of the ROI to the height and width of the model within the operation 1006. If the controller determines that the height or the width of the ROI is less than that of the model, the controller executes an operation 1008. If the controller determines that the height and the width of the ROI are not less than that of the model, the controller executes an operation 1010.

It should be noted that the height and width of the model can be equal or unequal, depending on the model implementation. For instance, in one example in which the model is trained to be applied to images having a square aspect ratio, the height is 416 pixels and width is 416 pixels. In other examples, the height is 512 pixels and the width is 512 pixels. In other examples, the height is 640 pixels and the width is 360 pixels. It will be apparent in view of this disclosure that other model sizes and dimensions can be used.

Continuing with the process 904, the controller adjusts 1008 the dimensions of the ROI that are less than the corresponding dimensions of the model to be equal to the corresponding dimensions. For instance, in some examples, the controller determines a difference between a dimension of the ROI and a corresponding dimension of the model and increases the dimension of the ROI by the difference. In some examples, this increase is effected by adding one-half of the difference to both ends of the ROI boundaries parallel to the dimension, thus preserving, as much as possible, the position of the target region within the ROI.

Continuing with the process 904, the controller determines 1010 whether the dimensions of the ROI are greater than those of the frame of image data. For instance, in some examples, the controller compares the height and width of the ROI to the height and width of the frame of image data within the operation 1010. If the controller determines that the height or the width of the ROI exceed the height or width of the frame, the controller executes an operation 1012. If the controller determines that the height and the width of the ROI do not exceed the height and width of the frame, the controller executes an operation 1014.

Continuing with the process 904, the controller adjusts 1012 the dimensions of the ROI that exceed the corresponding dimensions of the frame to be equal to the corresponding dimensions. For instance, in some examples, the controller determines a difference (e.g., via subtraction) between a dimension of the ROI and a corresponding dimension of the frame and reduces the dimension of the ROI by the difference. In some examples, this reduction is effected by removing one-half of the difference from both ends of the ROI boundaries parallel to the dimension, thus preserving, as much as possible, the position of the target region within the ROI.

Continuing with the process 904, the controller determines 1014 whether any boundary of the ROI is positioned outside of the frame of image data. For instance, in some examples, the controller implements a pixel-based coordinate system that encompasses, and extends beyond, the frame of image data. In these examples, the controller defines the boundaries of the ROI and the boundaries of the frame using the coordinate system. In one example, the controller compares, within the operation 1014, the coordinates of the ROI boundaries to the coordinates of the frame boundaries. If the controller determines that any of the coordinates of the ROI boundaries reside outside the coordinates of the frame boundaries, the controller executes an operation 1016. If the controller determines that none of the coordinates of the ROI boundaries reside outside the coordinates of the frame boundaries, the controller executes an operation 1018. As one illustration that can be seen with reference to FIG. 12B, the ROIs 1220, 1222, and 1224 have at least one boundary coordinate that resides outside the coordinates of the boundaries of the frame 1200.

Continuing with the process 904, the controller translates 1016 the ROI to position its boundaries within the frame of image data. For instance, in some examples, the controller identifies an endpoint of a boundary of the ROI that extends outside of the frame, determines a difference between the endpoint and a closest point of the frame, and moves the boundary of the ROI into the frame by an amount equal to the difference while preserving the dimensions of the ROI. In these examples, the controller repeats this procedure until no endpoints of an ROI boundary are outside of the frame. This approach preserves the size and shape of the ROI while translating it into the frame. As one illustration that can be seen with reference to FIG. 12C, the ROIs 1220, 1222, and 1224 have been translated into the frame 1200 by execution of the operation 1016.

Continuing with the process 904, the controller stores 1018 data defining the ROI as determined by the previous operations within a data structure for subsequent processing. For instance, in some examples, the controller stores the coordinates of the ROI in a local data store (e.g., the data 410 of FIGS. 4A-4C) within a data structure that associates the coordinates of the ROI with the frame of image data 1200.

Continuing with the process 904, the controller determines 1020 whether any additional, unprocessed target regions are associated with the frame of image data. For instance, in some examples, the controller determines, by accessing a data structure that associates the target regions with the frame of image data, whether any bounding boxes defined by the motion detection process and associated with the frame of image data 1200 have not yet been selected by the operation 1002. If the controller determines that no such unprocessed target regions exist, the process 904 may end.

If the controller determines that at least one such unprocessed target region exists, the controller returns to the operation 1002.

Returning to the process 814 of FIG. 9, the controller merges 906 ROIs associated with a frame of image data, if the ROIs satisfy merge criteria. For instance, in some examples, the controller executes ROI merge engine code (e.g., the ROI merge engine 716 of FIG. 7) to merge the ROIs. One example of an ROI merge process 906 is illustrated in FIG. 11.

Figure 11:
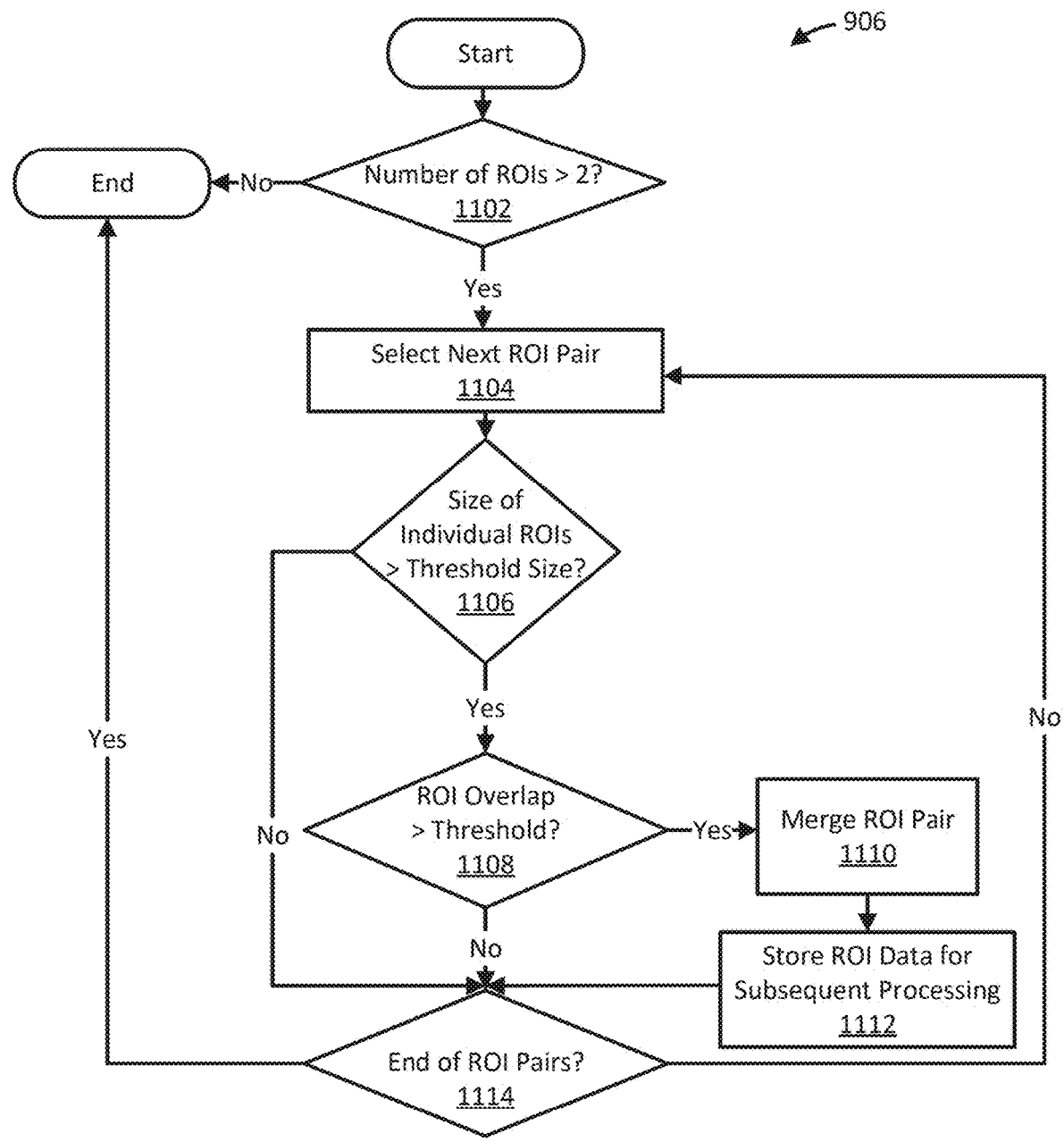
FIG. 11 is a flow diagram illustrating an ROI merge process, according to some examples described herein.

As shown in FIG. 11, the process 906 starts with the controller determining 1102 whether the number of ROIs generated for a frame of image data is greater than two. For instance, in some examples, the controller accesses one or more local data structures that specify associations between ROIs and frames of image data, such as described above with reference to the operation 1018 of FIG. 10. If the controller determines that less than two ROIs exist for a given frame of image data, the process 906 may end. If the controller determines that two or more ROIs exist that are associated with the frame, the processor executes an operation 1104.

Continuing with the process 906, the controller selects 1104 a pair of ROIs to analyze for potential merger. For instance, in some examples, the controller selects, from the one or more local data structures that specify associations between ROIs and the frame of image data, a combination of ROIs that has not yet been recorded as processed by the present instance of the process 906. In certain examples, the controller determines whether any particular ROIs are associated with objects that were previously detected and that are being tracked. For instance, in some examples, the controller accesses a data structure that lists previously detected objects that have not yet timed out. Object tracking and timeout are described further below with reference to process 816. In examples, the controller will not select these particular ROIs for inclusion in an ROI pair within the operation 1104.

Continuing with the process 906, the controller determines 1106 whether the individual ROIs within the pair of ROIs are larger than a threshold size. For instance, in some examples, the controller determines a pixel percentage for the ROIs in the ROI pair by dividing the total number of pixels in the ROI by the total number of pixels in the frame. Next, the controller compares individual pixel percentages to a threshold percentage (e.g., 50%). If the controller determines that both pixel percentages are greater than or equal to the threshold percentage, the controller executes an operation 1108. If the controller determines that one or both of the pixel percentages are less than the threshold percentage, the controller executes an operation 1114.

Continuing with the process 906, the controller determines 1108 whether an amount of overlap of the ROIs transgresses or otherwise exceeds a threshold amount of overlap. For instance, in some examples, the controller calculates an intersection over area (IOA) metric for the pair of ROIs by dividing a cardinality of the set of pixels within the intersection of the sets of pixels within the ROIs by a cardinality of the set of pixels within within the smaller ROI. A cardinality of set is the number of elements within the set. Next, the controller compares the IOA to a threshold percentage (e.g., 25%, 40%-60%, 50%, etc.). If the controller determines that the IOA is greater than or equal to the threshold percentage, the controller executes an operation 1110. Additionally or alternatively, the controller may calculate and compare an area over union (AOU) metric, or some other metric that indicates an amount of overlap between the ROIs, within the operation 1108. If the controller determines that the IOA is less than the threshold percentage, the controller executes the operation 1114.

Continuing with the process 906, the controller merges 1110 the pair of ROIs. For instance, in some examples, the controller creates a new ROI that includes a set of pixels that is the union of the sets of pixels within the ROIs of the ROI pair. Additionally, in some examples, the controller further expands the new ROI to include additional pixels positioned within regions of the frame that are defined by extending the boundaries of the ROIs to points of intersection between the extended boundaries. As one illustration, the frame 1200 of FIG. 12C has one example of an extension area 1226 that is formed by four points—1) a first point A at the initial intersection of the left vertical boundary of the ROI 1224 and the bottom horizontal boundary of the ROI 1222; 2) a second point B at the bottom, left boundary the ROI 1222; 3) a third point C at an intersection of an extension of the bottom horizontal boundary of the ROI 1224 until the extension meets an extension of the left vertical boundary of the ROI 1222; and 2) a fourth point D at the bottom, left boundary the ROI 1224.

Continuing with the process 906, the controller stores 1112 data defining the merged ROI within a data structure for subsequent processing. For instance, in some examples, the controller stores the coordinates of the merged ROI in a local data store (e.g., the data 410 of FIGS. 4A-4C) within a data structure that associates the coordinates with the ROI and the frame of image data 1200. An example of a merged ROI 1228 can be seen with reference to FIG. 12D. The merged ROI 1228 is formed from the union of the ROIs 1222, 1224, and the extension area 1226.

Continuing with the process 906, the controller determines 1114 whether any additional, unprocessed ROI pairs are associated with the frame of image data. For instance, in some examples, the controller inspects the sorted list described above with reference to the operation 1104, and/or the one or more local data structures that specify associations between ROIs and the frame of image data, for combinations of ROIs that have not yet been processed by the process 906. If the controller determines that no such unprocessed ROI pairs exist, the process 904 may end. If the controller determines that at least one such unprocessed ROI pair exists, the controller returns to the operation 1104.

It should be noted that some examples of the process 906 include certain operations in addition to the operations 1102-1114 described above. For instance, in some examples, prior to selecting the first pair of ROIs in the operation 1104, the controller sorts the ROIs into a list ranked by size and then selects only ROIs with a size (e.g., pixel count) that is at least a threshold percentage (e.g., 50%) of the pixel count of the frame. These examples may omit the operation 1106 as only suitably sized ROIs are selected. Additionally or alternatively, some examples may select, within the operation 1104, a pair of ROIs that includes at least one merged ROI. Where a merged ROI substantially overlaps another ROI, consolidating the merged ROI with other ROIs can yield additional performance benefits regarding inference rate without substantially increasing the rate of false positive object identification.

Figure 12D:
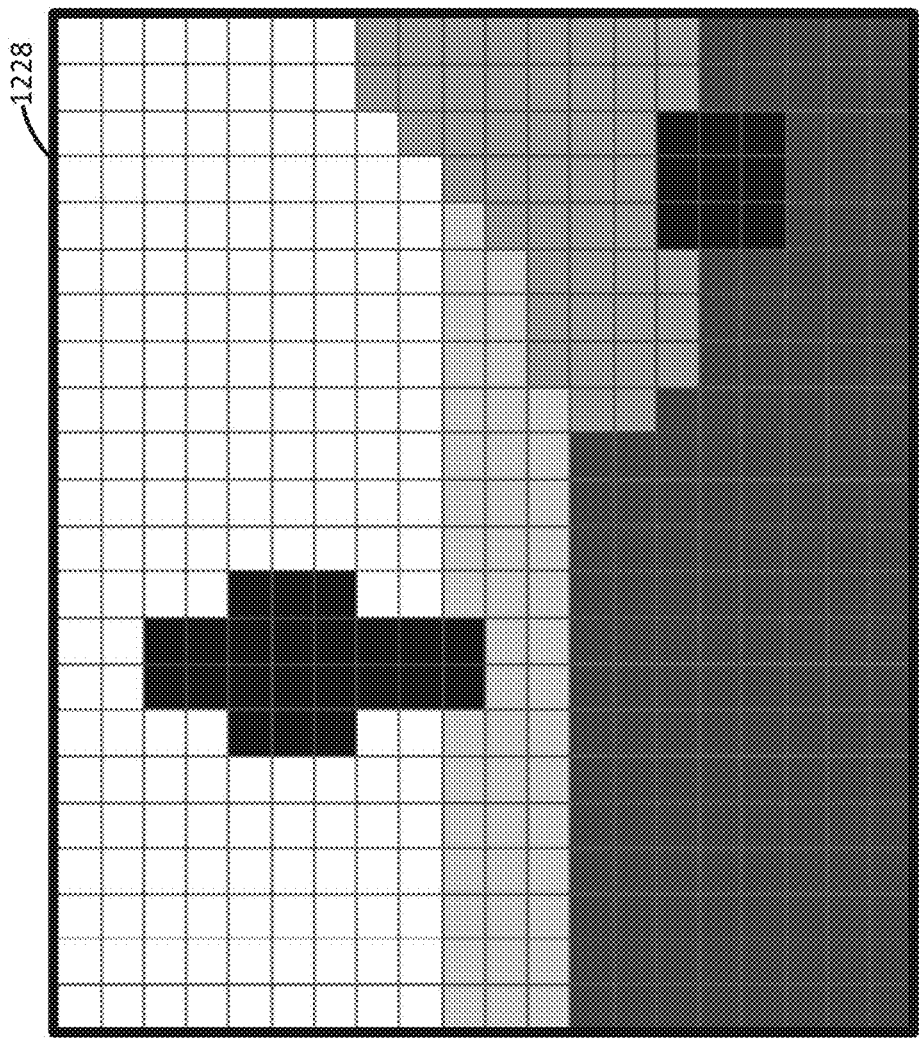
FIG. 12D is a diagram illustrating crops of ROIs associated with the frame of image data of FIG. 12A, according to some examples described herein.
Figure 12D:
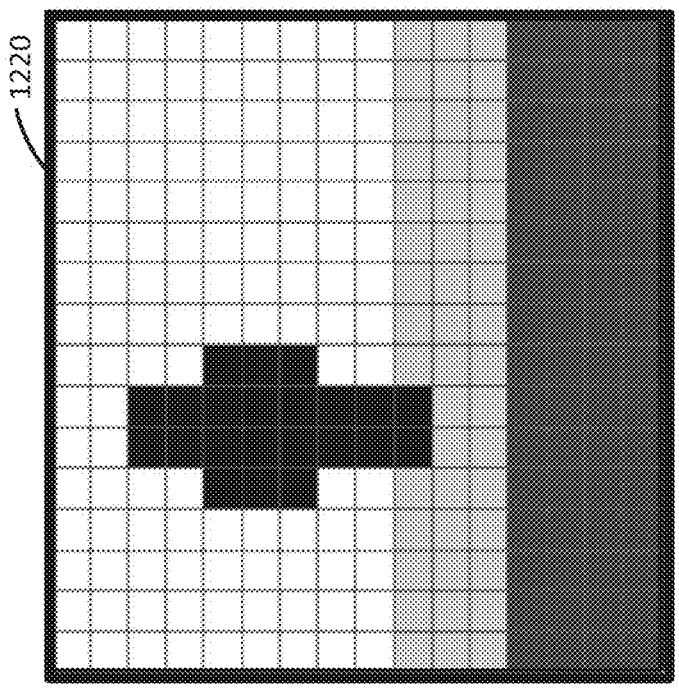

Returning to the process 814 of FIG. 9, the controller applies 908 an object detection model to certain ROIs (e.g., ROIs that are prioritized for object detection). For instance, in some examples, the controller executes object detection code (e.g., the object detector 718 of FIG. 7) to apply the object detection model to the ROIs. Application of this model involves activation and execution of instructions by an NPU (e.g., the NPU 708 of FIG. 7) in some examples. Further, in some examples, the controller prioritizes model application for certain ROIs over other ROIs. For instance, in certain examples, the controller applies the model to a configurable number of ROIs (e.g., two ROIs) based on size, with priority being given to the ROIs with the largest size (e.g., most pixels). These examples limit the number of ROIs to which the model is applied to ensure an acceptable rate of power and time consumption. In some examples, the time consumed by the operation 908 falls within a range between 100 milliseconds and 350 milliseconds (e.g., 250 milliseconds). As one example, FIG. 12D illustrates two ROIs 1220 and 1228 cropped from the image frame 1200 and to which the object detection model may be applied. Either or both of the ROIs may be scaled to fit the object detection model. In some examples, downsampling the ROIs may allow the ROIs to be processed more quickly (e.g., using an ANN) and/or with less power consumption (which may be particularly beneficial for battery powered sensors) than if the object detection processes were applied to full-size ROIs. It should be noted that, in situations where no ROIs are associated with an image frame, the controller adjusts (resizes, reshapes, pads, etc.) the entire frame to fit the object detection model prior to applying the object detection model to the scaled image data.

Figure 12E:
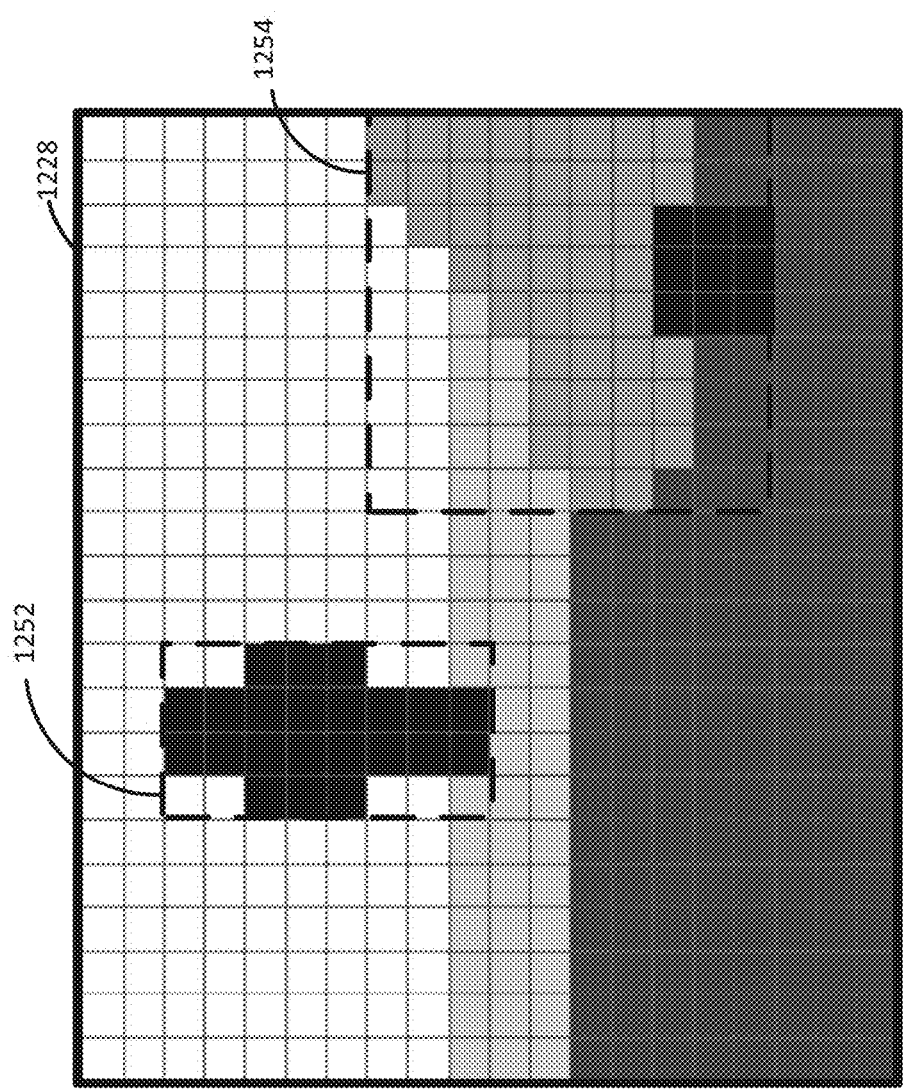
FIG. 12E is a diagram illustrating objects detected within the crops of FIG. 12D, according to some examples described herein.
Figure 12E:
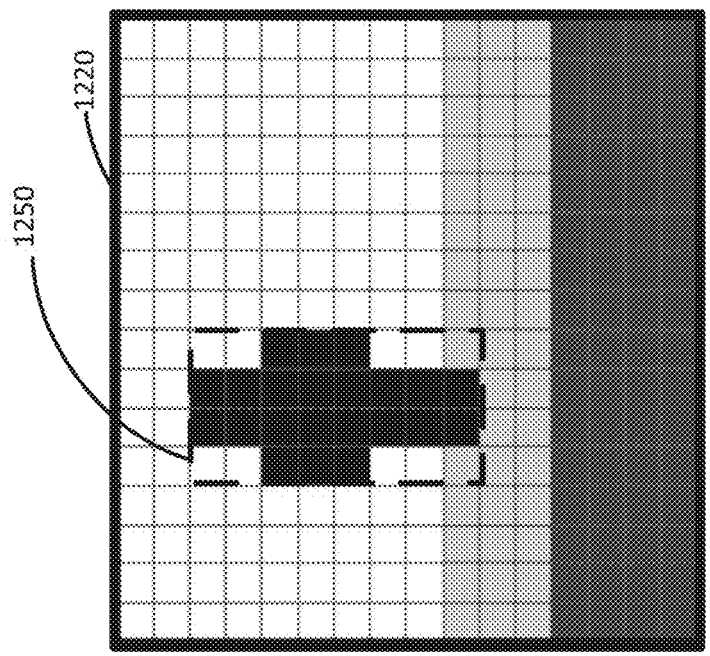

Continuing with the process 814, the controller stores 910 data defining regions depicting objects, within a data structure for subsequent processing. For instance, in some examples, the controller stores information specifying bounding boxes identified by the object detection model in a local data store (e.g., the data 410 of FIGS. 4A-4C) within a data structure that associates bounding box information with frames of image data (e.g., the frame of image data 1200). As one example, FIG. 12E illustrates three bounding boxes 1250, 1252, and 1254 identified within the ROIs 1220 and 1228.

Returning to FIG. 8, the controller 700 is further configured to perform an object tracking process 816 on the outputs of the motion detection process 812 and the object detection process 814 to track and categorize detected objects, as discussed in more detail below. Based on applying the motion detection process 812, the object detection process 814, and the object tracking process 816 to the captured image frames 808, the controller 700 produces output 818 (e.g. different classes of output). Depending on the output 818, the security device 702 can take different actions. For example, as described further below, the controller 700 can be configured to generate (e.g., via the use of Kalman filters) a class of output 818 for recognized moving objects (recognized objects paired with motion) and stationary objects (detected objects that are not paired with motion). In examples, detection of stationary objects or of recognized moving objects that are not deemed to represent a threat will not cause the security device 702 to trigger an alarm. Instead, the controller 700 may deactivate the image sensor 706, and the security device 702 may return to the low power state until the motion sensor 704 detects a new instance of motion. Detection of recognized moving objects that may represent a threat (such as people, for example) may cause the security device 702 to trigger an alarm. After triggering an alarm, the controller 700 may instruct the image sensor 706 (indicated at 820) to begin recording a video sequence at 822. The video sequence can be reviewed by a human operator (or a device hosting an artificial intelligence process) to determine whether or not to take further action.

Within the process 816, the controller 700 applies one or more AI models to the outputs from the motion detection process 812 and the object detection process 814 to track and categorize detected moving objects. For instance, in certain examples, the controller 700 controls the NPU 708 to apply one or more ANNs trained to produce the output(s) 818. In certain examples, the process 816 includes matching (or pairing) instances of detected motion with detected objects so as to identify and categorize moving objects. For example, if sufficient overlap exists between a first bounding box output from the motion detection process 812 and a second bounding box output from the object detection process 814, the controller 700 links the object associated with the first bounding box with the motion associated with the second bounding box to determine that the object is moving. In examples, the process 816 uses an implementation of the linear sum assignment algorithm to pair or match the first and second bounding boxes output from the motion detection process 812 and the object detection process 814, respectively. Thus, the pairing process can link detected motion (found during the motion detection process 812) with detected objects (identified during the object detection process 814) to produce the different classes of output 818, as discussed above.

In examples, a Kalman filter is used to track objects in the process 816. A Kalman filter is a control process that uses observations of measurements over time to predict future values of the measurements. The predictions of Kalman filters tend to be robust to noise and other inaccuracies present in the measurements. For individual frames (acquired at 808), the new object detection results (from 814) are compared to the set of currently tracked objects. If the first and second bounding boxes have any overlap, then the tracked objects are updated accordingly. If a detected object has no overlap with any currently tracked object, then a new tracked object is created. In examples, the process 816 includes a timeout feature such that tracked objects are deleted if they have not been updated within a period of time. In examples, detected motion (from the motion detection process 812) is also tracked from frame to frame using a Kalman filter, for example. As discussed above, the bounding boxes describing detected motion are compared with the bounding boxes describing tracked detected objects, and if there is overlap, the tracked object is tagged as a moving object. In contrast, a tracked object whose bounding box does not overlap with any bounding boxes output from the motion detection process 812 can be identified as a stationary object. Thus, the system can differentiate between moving objects and stationary objects.

In some examples, the output of the Kalman filter for a tracked object can be used to track detected motion. However, the shape of the bounding boxes may not be consistent frame-to-frame and therefore this could generate false motion. Accordingly, the above described examples use Kalman filters to independently track detected objects and detected motion, and pair the bounding boxes as discussed above to correlate objects with motion. Using the Kalman filters to track detected objects and detected motion over multiple image frames helps to reduce false positive alerts. In certain examples, the object detection process 814 can be tuned to detect one or more certain types of objects of interest with a relatively low threshold for certainty/confidence (e.g., with a low confidence indicator, as discussed above) that allows for false positives that are then filtered out during the object tracking process 816. In this manner, the system can be configured with an initial bias towards detection, so as to avoid missing an object of interest.

However, the subsequent filtering can remove false positive detections before an alarm is triggered, thereby reducing the number of false alarms that a user of the security system receives. For example, using the Kalman filters to track objects and motion through multiple image frames allows the system to reject isolated instances of motion and/or object detection that are not repeated frame-to-frame and which therefore may represent noise or simply a detection error. Thus, the use of Kalman filters or other processes to track detections over multiple frames of image data can add robustness to false negatives and filter out false positives.

Figure 13:
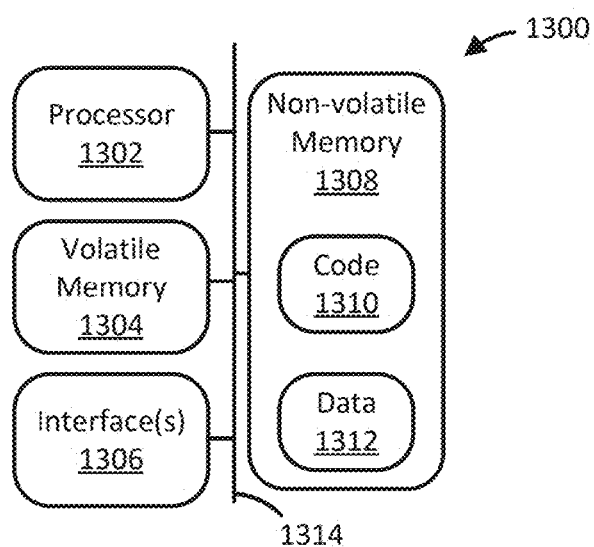
FIG. 13 is a schematic diagram of a computing device, according to some examples described herein.

Turning now to FIG. 13, a computing device 1300 is illustrated schematically. As shown in FIG. 13, the computing device includes at least one processor 1302, volatile memory 1304, one or more interfaces 1306, non-volatile memory 1308, and an interconnection mechanism 1314. The non-volatile memory 1308 includes code 1310 and at least one data store 1312.

In some examples, the non-volatile (non-transitory) memory 1308 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 1310 stored in the non-volatile memory can include an operating system and one or more applications or programs that are configured to execute under the operating system. Alternatively or additionally, the code 1310 can include specialized firmware and embedded software that is executable without dependence upon a commercially available operating system. Regardless, execution of the code 1310 can result in manipulated data that may be stored in the data store 1312 as one or more data structures. The data structures may have fields that are associated through colocation in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms.

Continuing the example of FIG. 13, the processor 1302 can be one or more programmable processors to execute one or more executable instructions, such as a computer program specified by the code 1310, to control the operations of the computing device 1300. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 1304) and executed by the circuitry. In some examples, the processor 1302 is a digital processor, but the processor 1302 can be analog, digital, or mixed. As such, the processor 1302 can execute the function, operation, or sequence of operations using digital values and/or using analog signals. In some examples, the processor 1302 can be embodied in one or more application specific integrated circuits (ASICs), microprocessors, digital signal processors (DSPs), graphics processing units (GPUs), NPUs, microcontrollers, field programmable gate arrays (FPGAs), programmable logic arrays (PLAs), or multicore processors. Examples of the processor 1302 that are multicore can provide functionality for parallel, simultaneous execution of instructions or for parallel, simultaneous execution of one instruction on more than one piece of data.

Continuing with the example of FIG. 13, prior to execution of the code 1310 the processor 1302 can copy the code 1310 from the non-volatile memory 1308 to the volatile memory 1304. In some examples, the volatile memory 1304 includes one or more static or dynamic random access memory (RAM) chips and/or cache memory (e.g. memory disposed on a silicon die of the processor 1302). Volatile memory 1304 can offer a faster response time than a main memory, such as the non-volatile memory 1308.

Through execution of the code 1310, the processor 1302 can control operation of the interfaces 1306. The interfaces 1306 can include network interfaces. These network interfaces can include one or more physical interfaces (e.g., a radio, an ethernet port, a USB port, etc.) and a software stack including drivers and/or other code 1310 that is configured to communicate with the one or more physical interfaces to support one or more LAN, PAN, and/or WAN standard communication protocols. The communication protocols can include, for example, TCP and UDP among others. As such, the network interfaces enable the computing device 1300 to access and communicate with other computing devices via a computer network.

The interfaces 1306 can include user interfaces. For instance, in some examples, the user interfaces include user input and/or output devices (e.g., a keyboard, a mouse, a touchscreen, a display, a speaker, a camera, an accelerometer, a biometric scanner, an environmental sensor, etc.) and a software stack including drivers and/or other code 1310 that is configured to communicate with the user input and/or output devices. As such, the user interfaces enable the computing device 1300 to interact with users to receive input and/or render output. This rendered output can include, for instance, one or more GUIs including one or more controls configured to display output and/or receive input. The input can specify values to be stored in the data store 1312. The output can indicate values stored in the data store 1312.

Continuing with the example of FIG. 13, the various features of the computing device 1300 described above can communicate with one another via the interconnection mechanism 1314. In some examples, the interconnection mechanism 1314 includes a communications bus.

Various inventive concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Descriptions of additional examples follow. Other variations will be apparent in light of this disclosure.

Example 1 is a method comprising identifying pixels indicative of motion based on a frame of pixels; selecting a region of interest within the frame based on the pixels indicative of motion, the region being a subset of the frame of pixels and including the pixels indicative of the motion; identifying an object based on pixels within the region; and issuing an alarm in response to the region including both the object and the pixels indicative of motion.

Example 2 includes the subject matter of Example 1, wherein selecting the region of interest comprises setting boundaries of the region that encompass the pixels indicative of the motion.

Example 3 includes the subject matter of Example 2, wherein setting the boundaries of the region comprises identifying a first length of a boundary of the pixels indicative of motion; calculating a second length that is equal to the first length multiplied by a factor; and setting a boundary of the region to have a length equal to the second length.

Example 4 includes the subject matter of Example 3, wherein calculating the second length comprises multiplying the first length by a factor of two.

Example 5 includes the subject matter of either Example 3 or Example 4, wherein identifying the first length comprises determining that the first length is greater than another length of another boundary of the pixels indicative of motion.

Example 6 includes the subject matter of 5, further comprising setting another boundary of the region to have another length equal to the second length.

Example 7 includes the subject matter of 6, wherein setting the boundaries of the region comprises setting the boundaries to be a square.

Example 8 includes the subject matter of any of Examples 2 through 7, wherein setting the boundaries of the region comprises establishing a size of the region to be equal to or greater than a size of input upon which a model is configured to operate.

Example 9 includes the subject matter of any of Examples 2 through 8, wherein setting the boundaries of the region comprises establishing a size of the region to be equal to or less than a size of the frame of pixels.

Example 10 includes the subject matter of any of Examples 2 through 9, wherein setting the boundaries of the region comprises translating the boundaries from a first position in which a portion of the boundaries resides outside the frame of pixels to a second position in which the portion of the boundaries is inside, or upon a boundary of, the frame of pixels.

Example 11 includes the subject matter of any of Examples 1 through 11, wherein the region is a first region, the object is a first object, and the method further comprises selecting a second region within the frame of pixels; selecting a third region within the frame of pixels; prioritizing the first region and the third region over the second region; and identifying a second object based on the second region.

Example 12 includes the subject matter of Example 11, wherein selecting the second region comprises identifying, based on the frame of pixels, an object that was identified previously within another frame of pixels.

Example 13 includes the subject matter of any of Examples 1 through 12, wherein the region is a first region, the object is a first object, and the method further comprises selecting a second region within the frame of pixels; selecting a third region within the frame of pixels; merging the second region with the third region to generate a merged region; and identifying a second object based on the merged region.

Example 14 includes the subject matter of Example 13, wherein merging the second region with the third region comprises determining that a size of the second region is equal to or greater than a threshold percentage of a size of the frame of pixels; and determining that a size of the third region is equal to or greater than a threshold percentage of the size of the frame of pixels.

Example 15 includes the subject matter of Example 14, wherein determining that the size of the second region is equal to or greater than the threshold percentage of the size of the frame of pixels comprises determining that the size of the second region is equal to or greater than 50% of the size of the frame of pixels.

Example 16 includes the subject matter of either Example 14 or Example 15, wherein merging the second region with the third region comprises determining that a size of an intersection between the second region and the third region is greater than a threshold percentage of a size of a smaller of the second region and the third region.

Example 17 includes the subject matter of Example 16, wherein merging the second region with the third region comprises determining that the size of the intersection between the second region and the third region is greater than 25% of the size of the smaller of the second region and the third region.

Example 18 includes the subject matter of any of Examples 1 through 17, further comprising scaling the region to comply with a model prior to applying the model to identify the object.

Example 19 is a computing device comprising a memory and at least one processor coupled with the memory. The at least one processor is configured to identify pixels indicative of motion based on a frame of pixels, select a region of interest within the frame based on the pixels indicative of motion, the region being a subset of the frame of pixels and including the pixels indicative of the motion, identify an object based on pixels within the region, and issue an alarm in response to the region including both the object and the pixels indicative of motion.

Example 20 includes the subject matter of Example 19, wherein to select the region of interest comprises to set boundaries of the region that encompass the pixels indicative of the motion.

Example 21 includes the subject matter of Example 20, wherein to set the boundaries of the region comprises to identify a first length of a boundary of the pixels indicative of motion; calculate a second length that is equal to the first length multiplied by a factor; and set a boundary of the region to have a length equal to the second length.

Example 22 includes the subject matter of Example 21, wherein to calculate the second length comprises to multiply the first length by a factor of two.

Example 23 includes the subject matter of either Example 21 or Example 22, wherein to identify the first length comprises to determine that the first length is greater than another length of another boundary of the pixels indicative of motion.

Example 24 includes the subject matter of Example 23, wherein the at least one processor is further configured to set another boundary of the region to have another length equal to the second length.

Example 25 includes includes the subject matter of Example 24, wherein to set the boundaries of the region comprises to set the boundaries to be a square.

Example 26 includes the subject matter of any of Examples 20 through 25, wherein to set the boundaries of the region comprises to establish a size of the region to be equal to or greater than a size of input upon which a model is configured to operate.

Example 27 includes the subject matter of any of Examples 20 through 26, wherein to set the boundaries of the region comprises to establish a size of the region to be equal to or less than a size of the frame of pixels.

Example 28 includes the subject matter of any of Examples 20 through 27, wherein to set the boundaries of the region comprises to translate the boundaries from a first position in which a portion of the boundaries resides outside the frame of pixels to a second position in which the portion of the boundaries is inside, or upon a boundary of, the frame of pixels.

Example 29 includes the subject matter of any of Examples 19 through 28, wherein the region is a first region; the object is a first object; and the at least one processor is further configured to select a second region within the frame of pixels; select a third region within the frame of pixels; prioritize the first region and the third region over the second region; and identify a second object based on the second region.

Example 30 includes the subject matter of Example 29, wherein to select the second region comprises to identify, based on the frame of pixels, an object that was identified previously within another frame of pixels.

Example 31 includes the subject matter of any of Examples 19 through 30, wherein the region is a first region; the object is a first object; and the at least one processor is further configured to select a second region within the frame of pixels; select a third region within the frame of pixels; merge the second region with the third region to generate a merged region; and identify a second object based on the merged region.

Example 32 includes the subject matter of Example 31, wherein to merge the second region with the third region comprises to determine that a size of the second region is equal to or greater than a threshold percentage of a size of the frame of pixels; and determine that a size of the third region is equal to or greater than a threshold percentage of the size of the frame of pixels.

Example 33 includes the subject matter of Example 32, wherein to determine that the size of the second region is equal to or greater than the threshold percentage of the size of the frame of pixels comprises to determine that the size of the second region is equal to or greater than 50% of the size of the frame of pixels.

Example 34 includes the subject matter of either Example 32 or Example 33, wherein to merge the second region with the third region comprises to determine that a size of an intersection between the second region and the third region is greater than a threshold percentage of a size of a smaller of the second region and the third region.

Example 35 includes the subject matter of Example 34, wherein to merge the second region with the third region comprises to determine that the size of the intersection between the second region and the third region is greater than 25% of the size of the smaller of the second region and the third region.

Example 36 includes the subject matter of any of Examples 19 through 35, wherein the at least one processor is further configured to scale the region to comply with a model prior to applying the model to identify the object.

Example 37 is one or more computer readable media storing sequences of instructions executable to use regions of interest to detect objects in a frame of image data, the sequences of instructions comprising instructions to identify pixels indicative of motion based on a frame of pixels; select a region of interest within the frame based on the pixels indicative of motion, the region being a subset of the frame of pixels and including the pixels indicative of the motion; identify an object based on pixels within the region; and issue an alarm in response to the region including both the object and the pixels indicative of motion.

Example 38 includes the subject matter of Example 37, wherein the instructions to select the region of interest comprise instructions to set boundaries of the region that encompass the pixels indicative of the motion.

Example 39 includes the subject matter of either Example 37 or Example 38, wherein the instructions to set the boundaries of the region comprises instructions to identify a first length of a boundary of the pixels indicative of motion; calculate a second length that is equal to the first length multiplied by a factor; and set a boundary of the region to have a length equal to the second length.

Example 40 includes the subject matter of Example 39, wherein the instructions to calculate the second length comprise to multiply the first length by a factor of two.

Example 41 includes the subject matter of Example 39, wherein the instructions to identify the first length comprise instructions to determine that the first length is greater than another length of another boundary of the pixels indicative of motion.

Example 42 includes the subject matter of any of Example 41, wherein the sequences of instructions comprise further instructions to set another boundary of the region to have another length equal to the second length.

Example 43 includes the subject matter of Example 42, wherein the instructions to set the boundaries of the region comprise instructions to set the boundaries to be a square.

Example 44 includes the subject matter of any of Examples 38 through 43, wherein the instructions to set the boundaries of the region comprise instructions to establish a size of the region to be equal to or greater than a size of input upon which a model is configured to operate.

Example 45 includes the subject matter of any of Examples 38 through 44, wherein the instructions to set the boundaries of the region comprise instructions to establish a size of the region to be equal to or less than a size of the frame of pixels.

Example 46 includes the subject matter of any of Examples 38 through 45, wherein the instructions to set the boundaries of the region comprise instructions to translate the boundaries from a first position in which a portion of the boundaries resides outside the frame of pixels to a second position in which the portion of the boundaries is inside, or upon a boundary of, the frame of pixels.

Example 47 includes the subject matter of any of Examples 37 through 46, wherein the region is a first region; the object is a first object; and the sequences of instructions further comprise instructions to select a second region within the frame of pixels; select a third region within the frame of pixels;
prioritize the first region and the third region over the second region; and identify a second object based on the second region.

Example 48 includes the subject matter of Example 47, wherein the instructions to select the second region comprise instructions to identify, based on the frame of pixels, an object that was identified previously within another frame of pixels.

Example 49 includes the subject matter of any of Examples 37 through 48, wherein the region is a first region; the object is a first object; and the sequences of instructions further comprise instructions to select a second region within the frame of pixels; select a third region within the frame of pixels; merge the second region with the third region to generate a merged region; and identify a second object based on the merged region.

Example 50 includes the subject matter of Example 49, wherein the instructions to merge the second region with the third region comprise instructions to determine that a size of the second region is equal to or greater than a threshold percentage of a size of the frame of pixels; and determine that a size of the third region is equal to or greater than a threshold percentage of the size of the frame of pixels.

Example 51 includes the subject matter of Example 50, wherein the instructions to determine that the size of the second region is equal to or greater than the threshold percentage of the size of the frame of pixels comprise instructions to determine that the size of the second region is equal to or greater than 50% of the size of the frame of pixels.

Example 52 includes the subject matter of either Example 50 or Example 51, wherein the instructions to merge the second region with the third region comprises instructions to determine that a size of an intersection between the second region and the third region is greater than a threshold percentage of a size of a smaller of the second region and the third region.

Example 53 includes the subject matter of any of Example 52, wherein the instructions to merge the second region with the third region comprises instructions to determine that the size of the intersection between the second region and the third region is greater than 25% of the size of the smaller of the second region and the third region.

Example 54 includes the subject matter of any of Examples 37 through 53, wherein the sequences of instruction further comprise instructions to scale the region to comply with a model prior to applying the model to identify the object.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Having described several examples in detail, various modifications and improvements will readily occur to those skilled in the art. Such modifications and improvements are intended to be within the scope of this disclosure. Accordingly, the foregoing description is by way of example only, and is not intended as limiting.

The invention claimed is:

1. A method comprising:
   identifying pixels indicative of motion based on a frame of pixels;
   selecting a region of interest within the frame based on the pixels indicative of motion, the region being a subset of the frame of pixels and including the pixels indicative of the motion;
   identifying an object based on pixels within the region; and
   issuing an alarm in response to the region including both the object and the pixels indicative of motion.

2. The method of claim 1, wherein selecting the region of interest comprises setting boundaries of the region that encompass the pixels indicative of the motion.

3. The method of claim 2, wherein setting the boundaries of the region comprises:
   identifying a first length of a boundary of the pixels indicative of motion;
   calculating a second length that is equal to the first length multiplied by a factor; and
   setting a boundary of the region to have a length equal to the second length.

4. The method of claim 3, wherein identifying the first length comprises determining that the first length is greater than another length of another boundary of the pixels indicative of motion.

5. The method of claim 4, further comprising setting another boundary of the region to have another length equal to the second length.

6. The method of claim 5, wherein setting the boundaries of the region comprises setting the boundaries to be a square.

7. The method of claim 3, wherein calculating the second length comprises multiplying the first length by a factor of two.

8. The method of claim 2, wherein setting the boundaries of the region comprises establishing a size of the region to be equal to or greater than a size of input upon which a model is configured to operate.

9. The method of claim 2, wherein setting the boundaries of the region comprises establishing a size of the region to be equal to or less than a size of the frame of pixels.

10. The method of claim 2, wherein setting the boundaries of the region comprises translating the boundaries from a first position in which a portion of the boundaries resides outside the frame of pixels to a second position in which the portion of the boundaries is inside, or upon a boundary of, the frame of pixels.

11. A computing device comprising:
    a memory; and
    at least one processor coupled with the memory and configured to:
      identify pixels indicative of motion based on a frame of pixels,
      select a region of interest within the frame based on the pixels indicative of motion, the region being a subset of the frame of pixels and including the pixels indicative of the motion,
      identify an object based on pixels within the region, and
      issue an alarm in response to the region including both the object and the pixels indicative of motion.

12. The computing device of claim 11, wherein to select the region of interest comprises to set boundaries of the region that encompass the pixels indicative of the motion.

13. The computing device of claim 12, wherein to set the boundaries of the region comprises to:
- identify a first length of a boundary of the pixels indicative of motion;
- calculate a second length that is equal to the first length multiplied by a factor; and
- set a boundary of the region to have a length equal to the second length.

14. The computing device of claim 13, wherein to identify the first length comprises to determine that the first length is greater than another length of another boundary of the pixels indicative of motion.

15. The computing device of claim 14, wherein the at least one processor is further configured to set another boundary of the region to have another length equal to the second length.

16. The computing device of claim 15, wherein to set the boundaries of the region comprises to set the boundaries to be a square.

17. The computing device of claim 13, wherein to calculate the second length comprises to multiply the first length by a factor of two.

18. The computing device of claim 12, wherein to set the boundaries of the region comprises to establish a size of the region to be equal to or greater than a size of input upon which a model is configured to operate.

19. The computing device of claim 12, wherein to set the boundaries of the region comprises to establish a size of the region to be equal to or less than a size of the frame of pixels.

20. The computing device of claim 12, wherein to set the boundaries of the region comprises to translate the boundaries from a first position in which a portion of the boundaries resides outside the frame of pixels to a second position in which the portion of the boundaries is inside, or upon a boundary of, the frame of pixels.

* * * * *